US009899127B2

(12) United States Patent
Patten et al.

(10) Patent No.: US 9,899,127 B2
(45) Date of Patent: *Feb. 20, 2018

(54) TETHERS FOR AIRBORNE WIND TURBINES

(71) Applicant: X Development LLC, Mountain View, CA (US)

(72) Inventors: Elias Wolfgang Patten, Seattle, WA (US); Damon Vander Lind, Alameda, CA (US); Leo Casey, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 14/928,850

(22) Filed: Oct. 30, 2015

(65) Prior Publication Data

US 2016/0056621 A1    Feb. 25, 2016

Related U.S. Application Data

(63) Continuation-in-part of application No. 14/531,449, filed on Nov. 3, 2014, now Pat. No. 9,230,714, which
(Continued)

(51) Int. Cl.
*H01B 7/00* (2006.01)
*H01B 9/00* (2006.01)
(Continued)

(52) U.S. Cl.
CPC ............ *H01B 9/006* (2013.01); *D07B 1/147* (2013.01); *D07B 5/006* (2015.07); *H01B 7/043* (2013.01);
(Continued)

(58) Field of Classification Search
CPC ........ H01B 7/025; H01B 1/147; H01B 5/005; F03D 5/00; F03D 11/00; F03D 7/043; F03D 7/1815
(Continued)

(56) References Cited

U.S. PATENT DOCUMENTS 2,589,507 A * 3/1952 Noyes ....................... H01B 5/10
174/102 E
2,953,627 A * 9/1960 Malneritch .............. H01B 7/14
174/102 R
(Continued)

FOREIGN PATENT DOCUMENTS

CN       101644805       2/2010
WO    WO 2012012429       1/2012
(Continued)

OTHER PUBLICATIONS

International Search Report prepared by the U.S. Patent Office in international patent application serial No. PCT/US2011/044539 dated Nov. 25, 2011.
(Continued)

*Primary Examiner* — William H Mayo, III
(74) *Attorney, Agent, or Firm* — McDonnell Boehnen Hulbert & Berghoff LLP

(57) ABSTRACT

A tether may include a core, a plurality of electrical conductors wound around the core, and a jacket surrounding the plurality of electrical conductors. The plurality of electrical conductors may include at least two groups of electrical conductors. Each group of electrical conductors of the at least two groups of electrical conductors may define a respective electrical path, where the respective electrical path is different from the electrical paths defined by other groups of electrical conductors of the at least two groups of the electrical conductors. Moreover, each group of electrical conductors of the at least two groups of electrical conductors
(Continued)

is located around a respective portion of the core, such that a cross-section of each group of electrical conductors of the at least two or more electrical conductors defines a respective arc around the respective portion of the core.

15 Claims, 9 Drawing Sheets

Related U.S. Application Data is a continuation of application No. 13/185,507, filed on Jul. 19, 2011, now Pat. No. 8,921,698.

(60) Provisional application No. 62/201,536, filed on Aug. 5, 2015, provisional application No. 61/365,655, filed on Jul. 19, 2010, provisional application No. 61/409,894, filed on Nov. 3, 2010.

(51) Int. Cl.
  *D07B 1/14* (2006.01)
  *H01B 7/04* (2006.01)
  *H02G 11/00* (2006.01)
  *D07B 5/00* (2006.01)
  *F03D 5/00* (2006.01)
  *F03D 80/00* (2016.01)

(52) U.S. Cl.
  CPC ............. *H02G 11/00* (2013.01); *D07B 1/148* (2013.01); *D07B 2201/209* (2013.01); *D07B 2201/2087* (2013.01); *D07B 2201/2088* (2013.01); *D07B 2201/2094* (2013.01); *D07B 2205/201* (2013.01); *D07B 2205/2003* (2013.01); *D07B 2205/2046* (2013.01); *D07B 2205/2064* (2013.01); *F03D 5/00* (2013.01); *F03D 80/00* (2016.05); *F05B 2240/917* (2013.01); *F05B 2240/921* (2013.01); *Y02E 10/725* (2013.01)

(58) Field of Classification Search
  USPC ............. 174/102 R, 108, 109, 110 R, 113 R, 174/120 R
  See application file for complete search history.

(56) References Cited

U.S. PATENT DOCUMENTS

| | | | |
|---|---|---|---|
| 3,261,907 A * | 7/1966 | Morrison | H01B 7/30 174/114 R |
| 3,602,632 A | 8/1971 | Ollis | |
| 3,684,821 A | 8/1972 | Miyauchi et al. | |
| 3,784,732 A | 1/1974 | Whitfill, Jr. | |
| 4,110,554 A | 8/1978 | Moore et al. | |
| 4,196,307 A | 4/1980 | Moore et al. | |
| 4,251,040 A | 2/1981 | Loyd | |
| 4,317,000 A | 2/1982 | Ferer | |
| 4,365,865 A * | 12/1982 | Stiles | G02B 6/4416 174/70 R |
| 4,440,974 A | 4/1984 | Naudet | |
| 4,486,669 A | 12/1984 | Pugh | |
| 4,646,428 A | 3/1987 | Marancik et al. | |
| 4,659,940 A | 4/1987 | Shepard | |
| 4,696,542 A | 9/1987 | Thompson | |
| 4,842,221 A | 6/1989 | Beach et al. | |
| 5,202,944 A | 4/1993 | Riordan | |
| 5,274,725 A | 12/1993 | Bottoms, Jr. et al. | |
| 5,495,547 A | 2/1996 | Rafie et al. | |
| 5,813,106 A | 9/1998 | Haug et al. | |
| 5,902,958 A | 5/1999 | Haxton | |
| 6,072,245 A | 6/2000 | Ockels | |
| 6,102,077 A | 8/2000 | Legallais et al. | |
| 6,297,455 B1 | 10/2001 | Wijnberg et al. | |
| 6,325,330 B1 | 12/2001 | Lavan, Jr. | |
| 6,392,151 B1 | 5/2002 | Rafie et al. | |
| 6,600,108 B1 | 7/2003 | Mydur et al. | |
| 6,781,254 B2 | 8/2004 | Roberts | |
| 6,859,590 B1 | 2/2005 | Zaccone et al. | |
| 7,462,781 B2 | 12/2008 | Varkey et al. | |
| 7,752,830 B2 | 7/2010 | Goldwater et al. | |
| 8,350,403 B2 | 1/2013 | Carroll | |
| 8,907,516 B2 | 12/2014 | Carroll | |
| 8,921,698 B2 | 12/2014 | Vander Lind et al. | |
| 8,957,312 B2 | 2/2015 | McCullough et al. | |
| 9,230,714 B2 * | 1/2016 | Vander Lind | F03D 5/00 |
| 2004/0089468 A1 * | 5/2004 | Carstensen | H01F 27/2823 174/128.1 |
| 2005/0199415 A1 | 9/2005 | Glew | |
| 2007/0209825 A1 * | 9/2007 | Glew | G02B 6/4429 174/113 R |
| 2009/0289148 A1 * | 11/2009 | Griffith | B63H 9/0685 244/155 R |
| 2010/0026007 A1 | 2/2010 | Bevirt | |
| 2010/0032947 A1 | 2/2010 | Bevirt | |
| 2010/0032948 A1 | 2/2010 | Bevirt | |
| 2010/0221112 A1 | 9/2010 | Bevirt | |
| 2010/0230546 A1 | 9/2010 | Bevirt | |
| 2010/0283253 A1 | 11/2010 | Bevirt | |
| 2010/0295320 A1 | 11/2010 | Bevirt | |
| 2010/0295321 A1 | 11/2010 | Bevirt et al. | |
| 2011/0042508 A1 | 2/2011 | Bevirt et al. | |
| 2011/0042509 A1 | 2/2011 | Bevirt et al. | |
| 2011/0042510 A1 | 2/2011 | Bevirt et al. | |
| 2011/0121570 A1 | 5/2011 | Bevirt et al. | |
| 2011/0127775 A1 | 6/2011 | Bevirt | |
| 2011/0266395 A1 | 11/2011 | Bevirt | |
| 2012/0286102 A1 | 11/2012 | Sinha et al. | |
| 2012/0287274 A1 | 11/2012 | Bevirt | |
| 2014/0262428 A1 | 9/2014 | Broughton, Jr. et al. | |
| 2015/0041598 A1 | 2/2015 | Nugent | |
| 2015/0110451 A1 | 4/2015 | Blazer et al. | |
| 2017/0213617 A1 | 7/2017 | Patten et al. | |

FOREIGN PATENT DOCUMENTS

| | | |
|---|---|---|
| WO | WO 2012013659 | 2/2012 |
| WO | WO2013052178 | 4/2013 |

OTHER PUBLICATIONS

Supplementary European Search Report prepared by the European Patent Office in Application No. EP 11 81 0283.9, dated Sep. 1, 2015.

Han et al., Overview of Semiconductive Shield Technology in Power Distribution Cables, Transmission and Distribution Conference and Exhibition, 2005/2006 IEEE PES, May 2006.

"Neutral Tethers," South Bay Cable Corporation, [Retrieved Mar. 14, 2016] from Internet http://www.southbaycable.com/products1.html.

"Armored Umbilicals," South Bay Cable Corporation, [Retrieved Mar. 14, 2016] from Internet http://www.southbaycable.com/products2.html.

"Tow Cables," South Bay Cable Corporation, [Retrieved Mar. 14, 2016] from Internet http://www.southbaycable.com/products3.html.

* cited by examiner

TETHERS FOR AIRBORNE WIND TURBINES

CROSS-REFERENCE TO RELATED APPLICATIONS

The present application claims priority to U.S. Provisional Application No. 62/201,536, filed Aug. 5, 2015, entitled "Tethers for Airborne Wind Turbines" and claims priority to U.S. patent application Ser. No. 14/531,449, filed Nov. 3, 2014, entitled "High Strength Windable Electromechanical Tether With Low Fluid Dynamic Drag and System Using Same," which in turn claims priority to U.S. patent application Ser. No. 13/185,507, filed Jul. 19, 2011, now U.S. Pat. No. 8,921,698, claims priority to U.S. Provisional Patent Application No. 61/365,655, filed Jul. 19, 2010, and claims priority to U.S. Provisional Patent Application No. 61/409,894, filed Nov. 3, 2010. The entire disclosure contents of U.S. Provisional Application No. 62/201,536, U.S. patent application Ser. No. 14/531,449, U.S. patent application Ser. No. 13/185,507, U.S. Provisional Patent Application No. 61/365,655, and U.S. Provisional Patent Application No. 61/409,894 are herewith incorporated by reference into the present application.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Tethers are described herein. Beneficially, embodiments described herein may reduce a size of the tether, reduce a weight of the tether, reduce a drag on the tether, and/or improve the resistance of the tether to various loads, such as fatigue loads.

In one aspect, a tether may comprise: a core; a plurality of electrical conductors wound around the core, wherein the plurality of electrical conductors comprises at least two groups of electrical conductors, wherein each group of electrical conductors of the at least two groups of electrical conductors defines a respective electrical path, wherein the respective electrical path is different from the electrical paths defined by other groups of electrical conductors of the at least two groups of the electrical conductors, and wherein each group of electrical conductors of the at least two groups of electrical conductors is located around a respective portion of the core, such that a cross-section of each group of electrical conductors of the at least two or more electrical conductors defines a respective arc around the respective portion of the core; and a jacket surrounding the plurality of electrical conductors.

In another aspect, a tether may comprise: a core comprising an axial rod; a compliant layer surrounding the core; a plurality of electrical conductors wound around the compliant layer, wherein each electrical conductor of the plurality of electrical conductors comprises an electrical conducting element and an insulating layer that surrounds the electrical conducting element, and wherein the plurality of electrical conductors comprises: a first group of electrical conductors defining a first electrical path, wherein the first group of electrical conductors is located along a first portion of an outer surface of the compliant layer, such that a cross-section of the first group of electrical conductors defines a first arc along the first portion of the outer surface, wherein the first portion of the outer surface comprises a first half of a circumference of the compliant layer, and a second group of electrical conductors defining a second electrical path that is different from the first electrical path, wherein the second group of electrical conductors is located along a second portion of the outer surface of the compliant layer, such that a cross-section of the second group of electrical conductors defines a second arc along the second portion of the outer surface, wherein the second portion of the outer surface comprises a second half of the circumference of the compliant layer; one or more separators located between the first group of electrical conductors and the second group of electrical conductors; and a jacket surrounding the plurality of electrical conductors.

In another aspect, a tether may comprise: a plurality of core elements; a first insulating layer surrounding the first plurality of core elements; a first semi-conducting layer surrounding the first insulating layer; a first plurality of electrical conductors located around the first conducting layer, wherein the first plurality of electrical conductors defines a first electrical path; a second semi-conducting layer surrounding the first plurality of electrical conductors; a second insulating layer surrounding the second semi-conducting layer; a third semi-conducting layer surrounding the second insulating layer; a second plurality of electrical conductors located around the third semi-conducting layer, wherein the second plurality of electrical conductors defines a second electrical path that is different from the first electrical path; a fourth semi-conducting layer surrounding the second plurality of electrical conductors; a third insulating layer surrounding the fourth semi-conducting layer; a plurality of strength elements located around the third insulating layer; and a jacket surrounding the plurality of strength elements.

In yet another aspect, a tether may comprise: a core; a first insulating layer surrounding the core; a first plurality of electrical conductors located around the first insulating layer, wherein the first plurality of electrical conductors defines a first electrical path; a second insulating layer surrounding the first plurality of electrical conductors; a second plurality of electrical conductors located around the second insulating layer, wherein the second plurality of electrical conductors defines a second electrical path that is different from the first electrical path; a third insulating layer surrounding the second plurality of electrical conductors; and a jacket surrounding the third insulating layer.

These as well as other aspects, advantages, and alternatives, will become apparent to those of ordinary skill in the art by reading the following detailed description, with reference where appropriate to the accompanying drawings.

DETAILED DESCRIPTION

Figure 1:
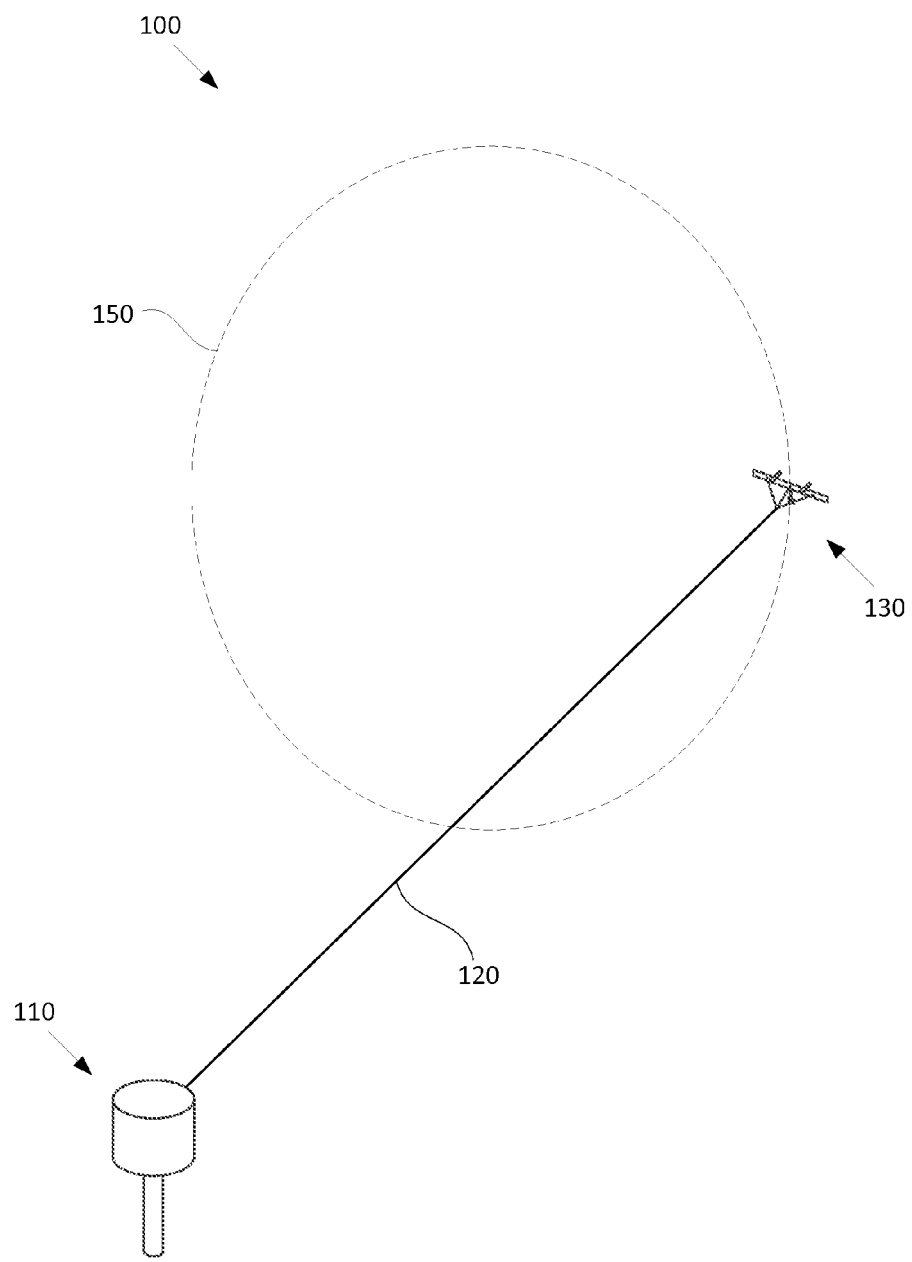
FIG. 1 depicts an Airborne Wind Turbine (AWT), according to an example embodiment.

Exemplary systems and methods are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems can be arranged and combined in a wide variety of different configurations, all of which are contemplated herein.

I. Overview

Illustrative embodiments relate to aerial vehicles, which may be used in a wind energy system, such as an Airborne Wind Turbine (AWT). In particular, illustrative embodiments may relate to or take the form of tethers that may be used in AWTs.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some implementations, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented, such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

Embodiments described herein relate to or take the form of tethers. Tethers described herein may be configured to withstand one or more forces when the aerial vehicle is in flight (e.g., tension from aerodynamic forces acting on the aerial vehicle), and configured to transmit electricity between the aerial vehicle and the ground station.

In an illustrative implementation, a tether may include a core, a plurality of electrical conductors wound around the core, and a jacket surrounding the plurality of electrical conductors. In some embodiments, the plurality of electrical conductors may include at least two groups of electrical conductors. Each group of electrical conductors of the at least two groups of electrical conductors may define a respective electrical path, where the respective electrical path is different from the electrical paths defined by other groups of electrical conductors of the at least two groups of the electrical conductors. Moreover, each group of electrical conductors of the at least two groups of electrical conductors may be located around a respective portion of the core, such that a cross-section of each group of electrical conductors of the at least two or more electrical conductors defines a respective arc around the respective portion of the core.

Moreover, in another illustrative implementation, a tether may include a core comprising an axial rod, a compliant layer surrounding the core, a plurality of electrical conductors wound around the compliant layer, where the plurality of electrical conductors includes a first group of electrical conductors and a second group of electrical conductors, one or more separators located between the first group of electrical conductors and the second group of electrical conductors, and a jacket surrounding the plurality of electrical conductors.

In some embodiments, each electrical conductor of the plurality of electrical conductors may include an electrical conducting element and an insulating layer that surrounds the electrical conducting element. Moreover, the first group of electrical conductors may define a first electrical path, and the second group of electrical conductors may define a second electrical path that is different from the first electrical path. In addition, in some embodiments, the first group of electrical conductors may be located along a first portion of an outer surface of the compliant layer, such that a cross-section of the first group of electrical conductors defines a first arc along the first portion of the outer surface. Further, in some embodiments, the first portion of the outer surface may comprise a first half of a circumference of the compliant layer. Yet further, in some embodiments, the second group of electrical conductors may be located along a second portion of the outer surface of the compliant layer, such that a cross-section of the second group of electrical conductors defines a second arc along the second portion of the outer surface. Moreover, in some embodiments, the second portion of the outer surface may comprise a second half of the circumference of the compliant layer.

Further, in another illustrative implementation, a tether may include: a plurality of core elements, a first insulating layer surrounding the first plurality of core elements, a first semi-conducting layer surrounding the first insulating layer, a first plurality of electrical conductors located around the first conducting layer, a second semi-conducting layer surrounding the first plurality of electrical conductors, a second insulating layer surrounding the second semi-conducting layer, a third semi-conducting layer surrounding the second insulating layer, a second plurality of electrical conductors located around the third semi-conducting layer, a fourth semi-conducting layer surrounding the second plurality of electrical conductors, a third insulating layer surrounding the fourth semi-conducting layer, a plurality of strength elements located around the third insulating layer, and a jacket surrounding the plurality of strength elements. In some embodiments, the first plurality of electrical conductors may define a first electrical path, and the second plurality of electrical conductors may define a second electrical path that is different from the first electrical path.

Yet further, in another illustrative implementation, a tether may include a core, a first insulating layer surrounding the core, a first plurality of electrical conductors located around the first insulating layer, a second insulating layer surrounding the first plurality of electrical conductors, a second plurality of electrical conductors located around the second insulating layer, a third insulating layer surrounding the second plurality of electrical conductors, and a jacket surrounding the third insulating layer. In some embodiments, the first plurality of electrical conductors may define a first electrical path, and the second plurality of electrical conductors may define a second electrical path that is different from the first electrical path.

Beneficially, embodiments described herein may reduce a size of the tether, reduce a weight of the tether, and/or reduce a drag on the tether, which may improve generation of electrical energy during crosswind flight of the aerial vehicle and/or transmission of electricity to an electrical grid. In addition, embodiments described herein may improve the resistance of a tether to various loads while the AWT is in operation, such as fatigue loads.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150.

B. Illustrative Components of an AWT

Figure 2:
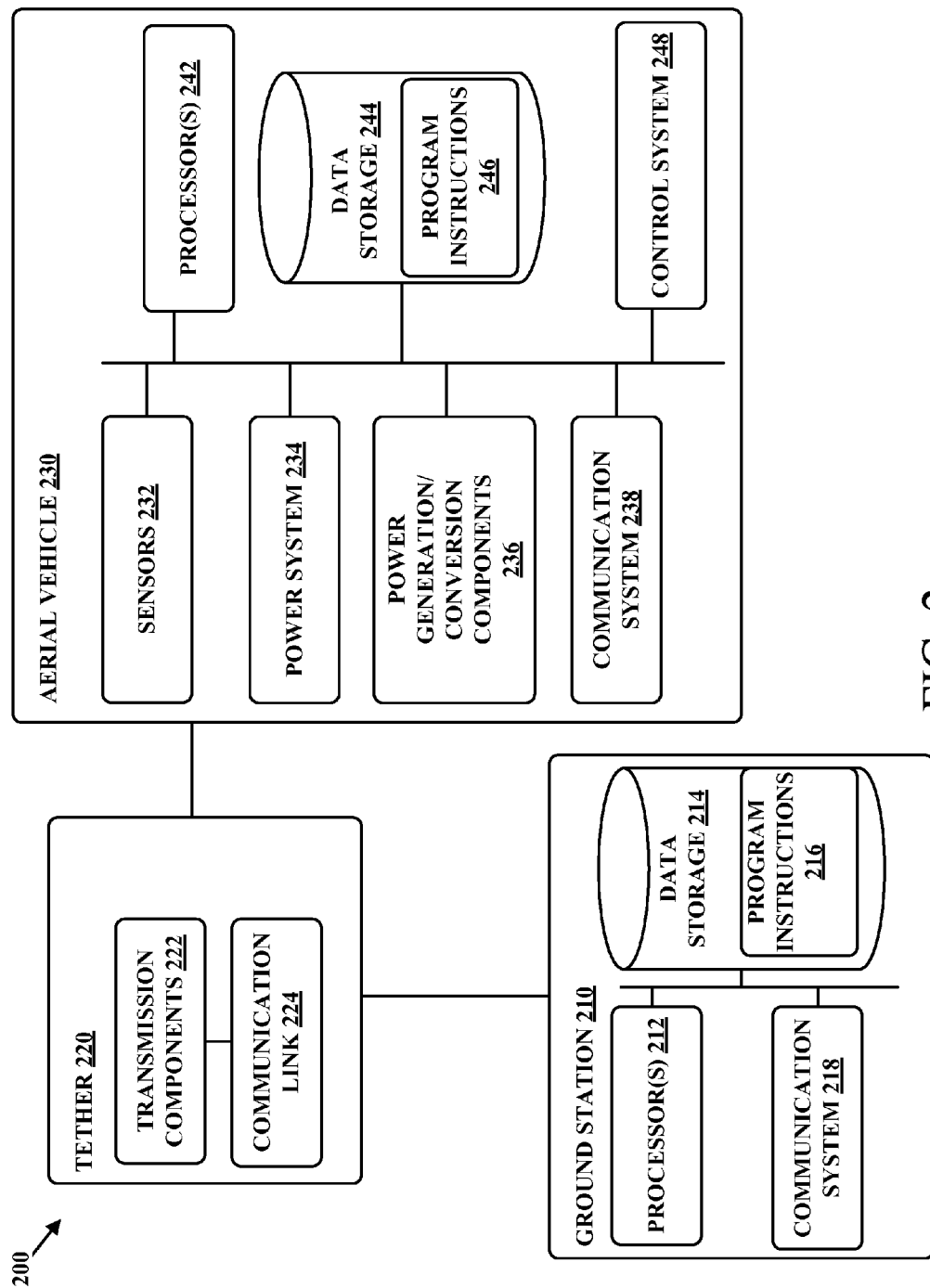
FIG. 2 is a simplified block diagram illustrating components of an AWT, according to an example embodiment.

FIG. 2 is a simplified block diagram illustrating components of the AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more electrical conductors that are configured to transmit electricity. And in at least one such example, the one or more electrical conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
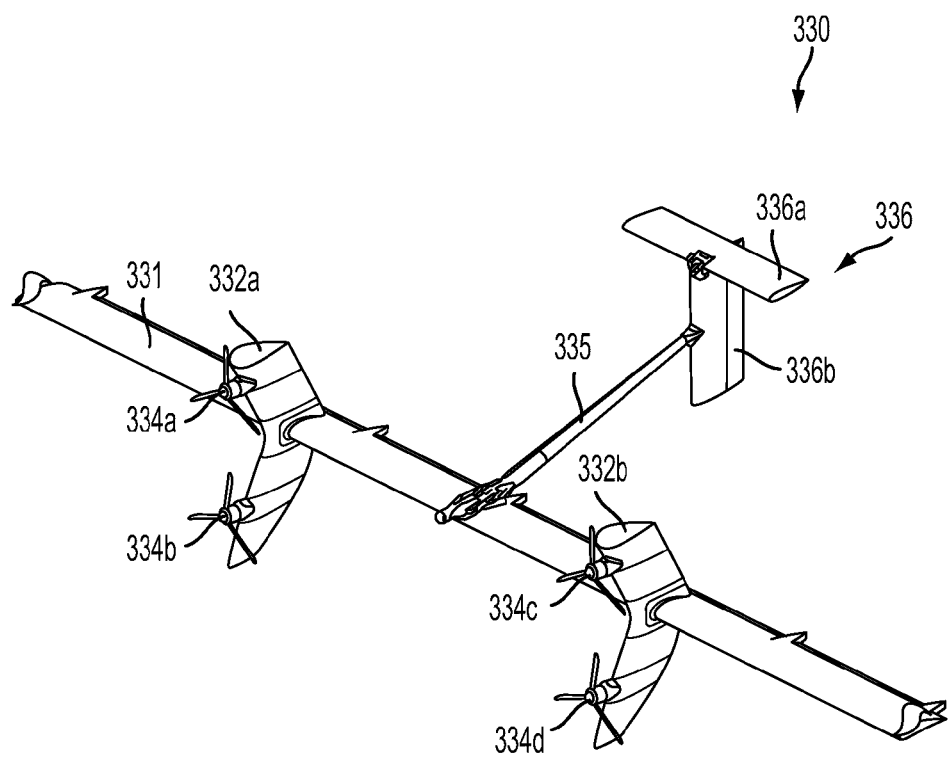
FIG. 3 depicts an aerial vehicle, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 130 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 130.

While the aerial vehicle 330 has been described above, it should be understood that the systems described herein could involve any suitable aerial vehicle that is connected to an airborne wind turbine tether, such as the tether 120 and/or the tether 220.

D. Aerial Vehicle Coupled to a Ground Station Via a Tether

Figure 4:
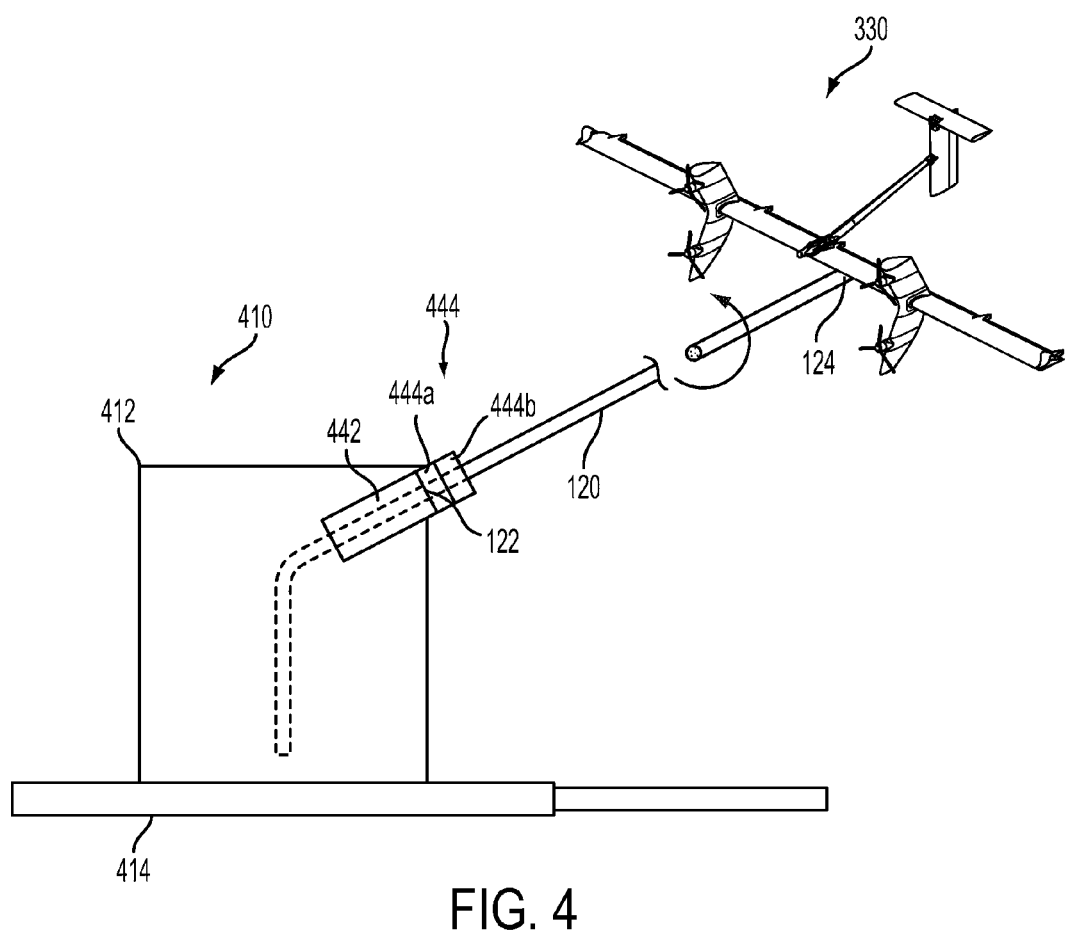
FIG. 4 depicts an aerial vehicle coupled to a ground station via a tether, according to an example embodiment.

FIG. 4 depicts the aerial vehicle 330 coupled to a ground station 410 via the tether 120, according to an example embodiment. Referring to FIG. 4, the ground station 410 may include a winch drum 412 and a platform 414. The ground station 110 and/or the ground station 210 may take the form of or be similar in form to the ground station 410. FIG. 4 is for illustrative purposes only and may not reflect all components or connections.

As shown in FIG. 4, the tether 120 may be coupled to a tether gimbal assembly 442 at a proximate tether end 122 and to the aerial vehicle 330 at a distal tether end 124. Additionally or alternatively, at least a portion of the tether 120 (e.g., the at least one insulated electrical conductor) may pass through the tether gimbal assembly 442. In some embodiments, the tether 120 may terminate at the tether gimbal assembly 442. Moreover, as shown in FIG. 4, the tether gimbal assembly 442 may also be coupled to the winch drum 412 which in turn may be coupled to the platform 414. In some embodiments, the tether gimbal assembly 442 may be configured to rotate about one or more axes, such as an altitude axis and an azimuth axis, in order to allow the proximate tether end 122 to move in those axes in response to movement of the aerial vehicle 330.

A rotational component 444 located between the tether 120 and the tether gimbal assembly 442 may allow the tether 120 to rotate about the long axis of the tether 120. The long axis is defined as extending between the proximate tether end 122 and the distal tether end 124. In some embodiments, at least a portion of the tether 120 may pass through the rotational component 444. Moreover, in some embodiments, the tether 120 may pass through the rotational component 444. Further, in some embodiments, the rotational component 444 may include a fixed portion 444a and a rotatable portion 444b, for example, in the form of one or more bearings and/or slip rings. The fixed portion 444a may be coupled to the tether gimbal assembly 442. The rotatable portion 444b may be coupled to the tether 120.

The use of the word fixed in the fixed portion 444a of the rotational component 444 is not intended to limit fixed portion 444a to a stationary configuration. In this example, the fixed portion 444a may move in axes described by the tether gimbal assembly 442 (e.g., altitude and azimuth), and may rotate about the ground station 410 as the winch drum 412 rotates, but the fixed portion 444a will not rotate about the tether 120, i.e., with respect to the long axis of the tether 120. Moreover, in this example, the rotatable portion 444b of the rotational component 444 may be coupled to the tether 120 and configured to substantially rotate with the rotation of tether 120.

Via the rotational component 444, the tether 120 may rotate about its centerline along the long axis as the aerial vehicle 330 orbits. The distal tether end 124 may rotate a different amount then the proximate tether end 122, resulting in an amount of twist along the length of the tether 420. With this arrangement, the amount of twist in the tether 420 may vary based on a number of parameters during crosswind flight of the aerial vehicle 330.

E. Illustrative Tethers

Figure 5A:
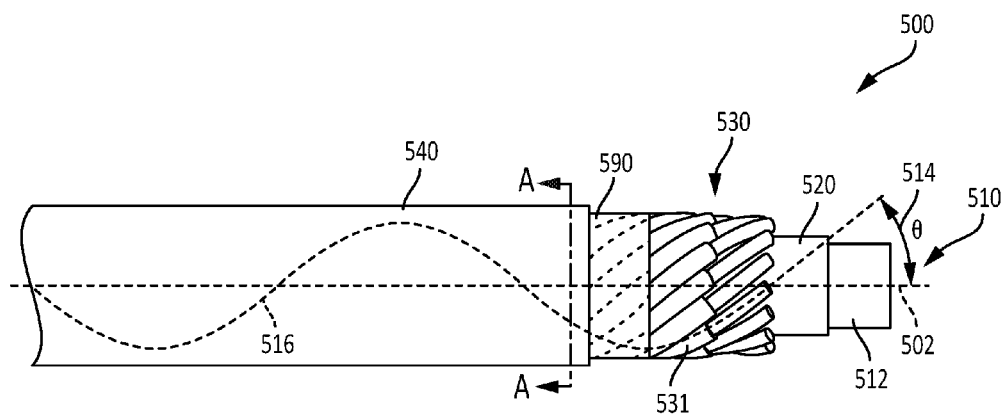
FIG. 5a depicts a tether, according to an example embodiment.

FIG. 5a depicts a tether 500, according to an example embodiment. The tether 120 and/or the tether 220 may take the form of or be similar in form to the tether 500. FIG. 5a and the remaining Figures depicting tethers are for illustrative purposes only and may not reflect all components or connections. Further, as illustrations the Figures may not reflect actual operating conditions, but are merely to illustrate embodiments described. For example, while a perfectly straight tether may be used to illustrate the described tether embodiments, during orbiting crosswind flight the tether may in practice exhibit some level of droop between the ground station and the aerial vehicle. Further still, the relative dimensions in the Figures may not be to scale, but are merely to illustrate the embodiments described.

As shown in FIG. 5a, the tether 500 may include a core 510, a compliant layer 520, a plurality of electrical conductors 530, and a jacket 540. The tether may have a long axis 502. For purposes of illustration only, the tether 500 in FIG. 5a is shown with a portion of some components removed (e.g., the jacket 540, the plurality of electrical conductors 530, the compliant layer 520) to illustrate the arrangement of components in the tether 500. Accordingly, FIG. 5a may be referred to as a partial cutaway view of the tether 500.

The core 510 may be a solid core and may comprise an axial rod 512. In some embodiments, the axial rod 512 may provide a significant contribution to the tensile strength and/or shear strength of the tether 500. Beneficially, the axial rod 512 may improve resistance of the tether 500 to fatigue loads while an AWT (e.g., the AWT 100 and/or AWT 200) is in operation. Further, the axial rod 512 may improve resistance of various components of the tether 500 to fatigue loads, such as the plurality of electrical conductors 530.

The dimension of the axial rod 512 may be selected based at least in part on a weight of the tether 500 and/or a predetermined loading of the tether, such as a predetermined fatigue loading of the tether 500. For use with AWTs, a preferred diameter of the axial rod 512 may be about 14 millimeters, with the overall tether 500 diameter around 27 millimeters.

The axial rod 512 may take various different forms in various different embodiments. For example, in some embodiments, the axial rod 512 may comprise pultruded fiber rod, carbon fiber rod, dry strength fiber (e.g., poly p-pheyylene-2,6-benzoobisoxazole ("PBO"), such as Zylon), fiberglass, one or more metals (e.g., aluminum), and/or a combination of carbon fiber, fiberglass, and/or one or more metals. As one example, the axial rod 512 may comprise a combination of fibers, such as a first carbon fiber having a first modulus and second carbon fiber having a second modulus that is greater than the first modulus. As another example, the axial rod 512 may comprise carbon fiber and fiberglass. Further, the axial rod 512 may comprise a matrix composite and/or carbon fiber and/or fiberglass, such as a metal matrix composite (e.g., aluminum matrix composite).

In some embodiments, the axial rod 512 may have a circular cross-section shape or may comprise other cross-section shapes. For example, in some embodiments, the axial rod 512 may have a rectangular cross-section shape, an oval cross-sectional shape, a trapezoidal cross-section shape, a pie-wedge cross-section shape, a triangular cross-section shape, etc. In addition, in some embodiments, the axial rod 512 may have a cross-section shape that varies along the long axis 502 of the tether.

Figure 5B:
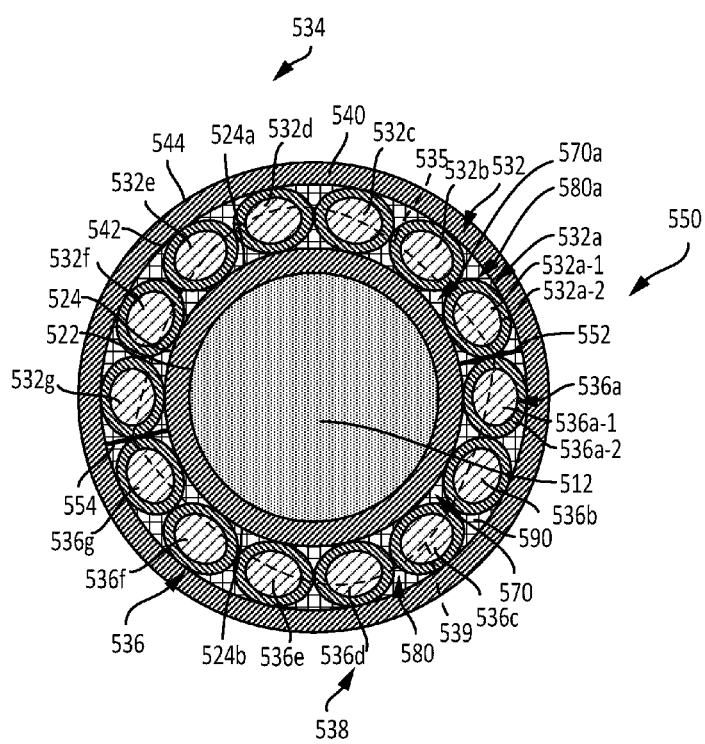
FIG. 5b depicts the tether shown in FIG. 5a in cross-section, according to an example embodiment.

FIG. 5b depicts the tether 500 in cross-section along line AA in FIG. 5a, according to an example embodiment. As shown in FIGS. 5a and 5b, the compliant layer 520 may surround the core 510. As shown in FIG. 5b, the compliant layer 520 may include an inner surface 522 that covers the core 510 and an outer surface 524 opposite the inner surface 522. In some embodiments, the compliant layer 520 may be extruded around the core 510.

The compliant layer 520 may take various different forms in various different embodiments. For instance, in some embodiments, the compliant layer 520 may comprise a thermoplastic elastomer ("TPE"). Moreover, in some embodiments, the compliant layer 520 may have a preferred thickness of about 1.5 millimeters. Beneficially, the compliant layer 520 may improve the effective poisson's ratio of the tether 500 while the AWT is in operation, as compared to a similar or identical tether without the compliant layer 520. Further, the compliant layer 520 may improve resistance of various components of the tether 500 to fatigue loads, such as the plurality of electrical conductors 530. Further still, the compliant layer 520 may insulate the core 510 from the plurality of electrical conductors 530. Additionally, the compliant layer 520 may reduce wear between the core 510 and a component that would be in contact with the core 510 in the absence of the compliant layer 520, such as the plurality of electrical conductors 530.

The compliant layer 520 may comprise other materials. For example, in some embodiments, the compliant layer 520 may comprise a foam and/or a dry strength fiber (e.g., aramid, such as Kevlar). Further, in some embodiments, the compliant layer 520 may include a plurality of surface features (not shown) on the outer surface 524 of the compliant layer 520, such as plurality of ridges. In some examples, a compliant layer with a plurality of surface features may have a different modulus than a compliant layer without a plurality of surface features.

Further, as shown in FIGS. 5a and 5b, the plurality of electrical conductors 530 may be wound around the outer surface 524 of the compliant layer 520. The plurality of electrical conductors 530 may be configured to transmit electricity. For example, the plurality of electrical conductors 530 may be configured for high-voltage AC or DC power transmission (e.g., greater than 1,000 volts). For instance, the plurality of electrical conductors 530 may be configured to carry an AC or DC voltage of between 1 kilovolt and 5 kilovolts, or higher, and an associated power transmission current of between 50 amperes to 250 amperes.

In some embodiments, the plurality of electrical conductors 530 may be helically wound around the outer surface 524 of the compliant layer 520. Further, in some such embodiments, the plurality of electrical conductors 530 may be helically wound around the outer surface 524 of the compliant layer 520 with a helical angle ($\Theta$) 514 between 15 to 45 degrees, such as 20 to 45 degrees, 35 to 40 degrees (e.g., 38.3 degrees), or 40 to 45 degrees (e.g., 42 degrees). In some such embodiments, the helical angle 514 may be relative to the long axis 502 of the tether 500. In addition, a particular conductor 531 that is helically wound around the outer surface 524 of the compliant layer 520 may follow helical path 516 around the long axis of the tether 500.

The plurality of electrical conductors 530 may be wound around the outer surface 524 of the compliant layer 520 in other ways. For example, in some embodiments, electrical conductors in the plurality of electrical conductors 530 may have a reverse oscillating lay around the outer surface 524.

The plurality of electrical conductors 530 may include at least two groups of electrical conductors. For instance, as shown in FIG. 5b, in some embodiments, the plurality of electrical conductors 530 may include a first group of electrical conductors 532 and a second group of electrical conductors 536. The first group of electrical conductors 532 may define a first electrical path 534, and the second group of electrical conductors 536 may define a second electrical path 538 that is different from the first electrical path 534.

In some embodiments, the first group of electrical conductors 532 may be located along a first portion 524a of the outer surface 524 of the compliant layer 520, such that a cross-section of the first group of electrical conductors 532 defines a first arc 535 along the first portion 524a of the outer surface 524. Further, in some such embodiments, the first arc 535 along the first portion 524a of the outer surface 524 may take the form of a semi-circle or a portion of a circle. Yet further, in some embodiments, the first portion 524a may comprise a first half of a circumference of the compliant layer 520.

Moreover, in some embodiments, the second group of electrical conductors 536 may be located along a second portion 524b of the outer surface 524 of the compliant layer 520, such that a cross-section of the second group of electrical conductors 536 defines a second arc 539 along the second portion 524b of the outer surface 524. Further, in some embodiments, the second arc 539 along the second portion 524b of the outer surface 524 may take the form of a semi-circle or a portion of a circle. Yet further, in some embodiments, the second arc 539 may be substantially symmetrical to the first arc 535. In addition, in some embodiments, the second portion 524b may comprise a second half of the circumference of the compliant layer 520. The term "substantially symmetrical," as used in this disclosure, means exactly symmetrical or one or more deviations from exactly symmetrical that do not significantly impact transmission of electricity as described herein.

In the illustrated example, the first group of electrical conductors 532 may comprise seven electrical conductors 532a-g. However, in other examples, the first group of electrical conductors 532 may comprise more or less than seven conductors. The number of electrical conductors of the first group of electrical conductors 532 may be selected based at least in part on a size of the tether 500, a predetermined amount of electrical power transmission along the first electrical path 534, a predetermined amount of electrical power transmission of the tether 500, an operating voltage, and/or an operating temperature.

In addition, in the illustrated example, the second group of electrical conductors 536 may comprise seven electrical conductors 536a-g. However, in other examples, the second group of electrical conductors 536 may comprise more or less than seven conductors. The number of electrical conductors of the second group of electrical conductors 536 may be selected based at least in part on a size of the tether 500, a predetermined amount of electrical power transmission along the second electrical path 538, a predetermined amount of electrical power transmission of the tether 500, an operating voltage, and/or an operating temperature.

In some embodiments, the first group of electrical conductors 532 may have the same number of conductors as the second group of electrical conductors 536. However, in other embodiments, the first group of electrical conductors 532 may have more or less electrical conductors than the second group of electrical conductors 536.

Accordingly, in the illustrated example, the plurality of electrical conductors 530 may include fourteen electrical conductors 532a-g, 536a-g. However, in other examples, the plurality of electrical conductors 530 may include more or less than fourteen electrical conductors. The number of electrical conductors of the plurality of electrical conductors 530 may be selected based at least in part on a size of the tether 500, a predetermined amount of electrical power transmission of the tether 500, an operating voltage, and/or an operating temperature.

Further, in some embodiments, the first group of electrical conductors 532 and the second group of electrical conductors 536 may be configured to operate differently. For instance, in an AC power transmission arrangement, the first group of electrical conductors 532 may be configured to carry a first phase of electrical power along the first electrical path 534, and the second group of electrical conductors 536 may be configured to carry a second phase of electrical power along the second electrical path 538 that is different from the first phase of electrical power. Moreover, in a DC power transmission arrangement, the first group of electrical conductors 532 may be configured to operate at a first potential along the first electrical path 534, and the second group of electrical conductors 536 may be configured to operate at a second potential along the second electrical path 538 that is different from the first potential. As one example, the first potential may be +2000 volts relative to ground, and the second potential may be −2000 volts relative to ground. As another example, the first potential may be a high voltage, and the second potential may be near ground potential.

In some embodiments, the tether 500 may further include one or more separators 550 located between the first group of electrical conductors 532 and the second group of electrical conductors 536. In some embodiments, the separators 550 may comprise two rods 552, 554 that each extend between the compliant layer 520 and the jacket 540. Further, in some such embodiments, the rods 552, 554 may have a rectangular cross-section. The rods 552, 554 may insulate the first group of electrical conductors 532 from the second group of electrical conductors 536. Moreover, in some embodiments, when the plurality of conductors 530 is helically wound around the outer surface 524 of the compliant layer 520, the separator 550 may also be helically wound around the outer surface 524 of compliant layer 520. The rods 552, 554 may alternatively or additionally comprise any material that the axial rod 512 may comprise and may have any of the cross-section shapes of the axial rod 512.

In addition, in some embodiments, the compliant layer 520 may comprise one or more separators that function in a similar manner as the separator(s) 550. With this arrangement, the separator(s) may be a part of the compliant layer 520. For instance, in some such embodiments, the separator(s) may comprise two features that each extend between the outer surface 524 of the compliant layer 520 and an inner surface 542 of the jacket 540 in a similar way as the rods 552, 554 extend between the compliant layer 520 and the jacket 540. The two features may insulate the first group of electrical conductors 532 from the second group of electrical conductors 536 in a similar way as the rods 552, 554 insulate the first group of electrical conductors 532 from the second group of electrical conductors 536. Moreover, in some embodiments, when the plurality of conductors 530 is helically wound around the outer surface 524 of the compliant layer 520, the separator(s) may also be helically wound around the outer surface 524 of compliant layer 520.

In some such embodiments, the two features of the separator(s) may comprise two strakes, walls, and/or ridges, or a combination of strakes, walls, or ridges. Moreover, in some embodiments, the two features may be formed in the compliant layer 520 as the compliant layer 520 is formed. Further, in some embodiments, the two features may be formed in the compliant layer 520 after the compliant layer 520 is formed.

The plurality of electrical conductors 530 may take various different forms in various different embodiments. For instance, in some embodiments, at least one electrical conductor 532a may comprise an electrical conducting element 532a-1 and an insulating layer 532a-2. The electrical conducting element 532a-1 may be configured to conduct electric current, and the insulating layer 532a-2 may surround the electrical conducting element 532a-1 and form a sheath around the electrical conducting element 532a-1. In some embodiments, the electrical conducting element 532a-1 may comprise aluminum. Moreover, in some embodiments, the electrical conducting element 532a-1 may have a preferred thickness of 10 American Wire Gauge (AWG). In some embodiments, the dimension of the electrical conducting element 532a-1 may be selected based at least in part on a size of the tether 500, a predetermined amount of electrical power transmission along the first electrical path 534, a predetermined amount of electrical power transmission of the tether 500, an operating voltage, and/or an operating temperature.

The electrical conducting element 532a-1 may also comprise other materials. For example, in some embodiments, the electrical conducting element 532a-1 may comprise copper, an alloy of aluminum, an alloy of copper, hardened or annealed aluminum, hardened or annealed cooper, cooper clad aluminum, or any other material which may allow for the conduction of electric current. In some embodiments, the electrical conducting element 532a-1 may have a round shape, a rectangular shape, or a trapezoidal shape.

In some embodiments, the insulating layer 532a-2 may comprise Tefzel and/or similar flouropolymers. Further, in some such embodiments, the insulating layer 532a-2 may have a preferred thickness of 0.5 millimeters. In some embodiments, the dimension of the insulating layer 532a-2 may be selected based at least in part on a size of the electrical conducting element 532a-1, tether 500, a predetermined amount of electrical power transmission along the first electrical path 534, a predetermined amount of electrical power transmission of the tether 500, an operating voltage, and/or an operating temperature.

The insulating conductor layer 532a-2 may also comprise other materials. For example, in some embodiments, the insulating conductor layer 532a-2 may comprise TPE, polypropylene, ethylene propylene rubber ("EPR"), polyethylene, polytetrafluoroethylene, Kaptan, and/or a 4-methylpentene-1-based olefin copolymer (e.g., TPX).

In some embodiments, each electrical conductor of the plurality of electrical conductors 530 may comprise the same material and have the same thickness. However, in some embodiments, at least two electrical conductors of the plurality of electrical conductors 530 may comprise different materials and/or have different thicknesses. For example, in some embodiments, an electrical conductor in the first group of electrical conductors that is adjacent to an electrical conductor in the second group of electrical conductors may have a different thickness than an electrical conductor in the first group of electrical conductors that is adjacent to two electrical conductors in the first group of electrical conductors.

For instance, the electrical conductor 532a in the first group of electrical conductors 532 that is adjacent to electrical conductor 536a in the second group of electrical conductors 536 may have electrical conducting element 532a-1 that has a thickness that is less than a thickness of an electrical conducting element of electrical conductor 532d in the first group of electrical conductors 532 that is adjacent to electrical conductors 532c, 532e in the first group of electrical conductors 532.

In addition, the electrical conductor 532a in the first group of electrical conductors 532 that is adjacent to the electrical conductor 536a in the second group of electrical conductors 536 may have insulating layer 532a-2 that has a thickness that is more (or less) than a thickness of an insulating layer of the electrical conductor 532d in the first group of electrical conductors that is adjacent to electrical conductors 532c, 532e in the first group of electrical conductors 532. Similarly, the electrical conductor 536a in the second group of electrical conductors 536 that is adjacent to the electrical conductor 532a in the first group of electrical conductors 532 may have similar thicknesses as the electrical conductor 532a.

Moreover, in some embodiments, each electrical conductor of the plurality of electrical conductors 530 may include an electrical conductive element and an insulating layer. However, in other embodiments, at least one electrical conductor of the plurality of electrical conductors 530 may not include an insulating layer.

Yet further, in some embodiments, at least one electrical conductor of the plurality of electrical conductors 530 may further include metallic shielding. In addition, in some such embodiments, each electrical conductor of the plurality of electrical conductors 530 may further include metallic shielding. Moreover, in some embodiments, at least one electrical conductor of the plurality of electrical conductors may further include a core, and the electrical conductor element may be wound around the core. The core may comprise any of the materials and have any of the cross-section shapes of the axial rod 512. Further, the electrical conductor may be wound around the core in the same or similar way as the plurality of electrical conductors 530 is wound around the compliant layer 520. In addition, in some embodiments, at least one conductor of the plurality of electrical conductors 530 may be stranded or compact stranded.

In some embodiments, as shown in FIGS. 5a and 5b, the plurality of electrical conductors 530 may be helically wound around the outer surface 524 of the compliant layer 520, such that (i) first interstices 570 are located between adjacent electrical conductors and the compliant layer 520 and (ii) second interstices 580 are located between adjacent electrical conductors and the jacket 540. For instance, in some embodiments, a first interstice 570a may be located between electrical conductor 532a, electrical conductor 532b, and the outer surface 524 of the compliant layer 520. Moreover, in some embodiments, a second interstice 580a may be located between electrical conductor 532a, electrical conductor 532b, and the inner surface 542 of the jacket 540.

In some embodiments, the tether 500 may further include a fill material 590 located between the compliant layer 520 and jacket 540, such that the fill layer 590 fills the first interstices 570 and/or second interstices 580. With this arrangement, the fill material 590 may block moisture from the plurality of electrical conductors 530. For instance, in some embodiments, the fill material 590 may block moisture from diffusing inside of the tether 500 along the plurality of electrical conductors 530.

Fill material 590 may take various different forms in various different embodiments. For instance, in some embodiments, the fill material 590 may include a vulcanizing rubber on silicone, such as a room-temperature vulcanizing rubber. In addition, the fill material 590 may include mylar. In some such embodiments, the fill material 590 may include rubber and mylar tape wrapped around the rubber. With this arrangement, the mylar tape may hold the rubber and electrical conductors of the plurality of electrical of conductors 530 in place while the rubber cures. Further, in some such embodiments, the fill material 590 may comprise one or more filler rods, fibers, and/or tapes.

Moreover, in some embodiments, when the plurality of electrical conductors 530 is wound around the compliant layer 520 in a way other than helically wound, the tether 500 may have interstices similar to first interstices 570 and second interstices 580. In some such embodiments, the fill material 590 may fill at least some of the interstices.

Further, as shown in FIG. 5a, the jacket 540 surrounds the plurality of electrical conductors 530. As shown in FIG. 5b, the jacket 540 may include the inner surface 542 that covers at least a portion of the plurality of electrical conductors 530, and an outer surface 544 that is opposite the inner surface 542.

The jacket 540 may take various different forms in various different embodiments. For instance, the jacket 540 may include a thermoplastic polyurethane ("TPU"), polypropylene, hytrel, and/or nylon (e.g., nylon 11). In some embodiments, the jacket 540 may be extruded over the plurality of electrical conductors 530. Moreover, in some embodiments, when the tether 500 includes the fill material 590, the jacket 540 may be extruded over the fill material 590. Further, in some embodiments, the jacket 540 may have a preferred thickness of 1.2 or 1.5 millimeters. Other thicknesses are possible as well.

In some embodiments, one or more materials of the jacket 540 may be selected to increase the visibility of the tether 500 to humans and/or animals. For instance, in some embodiments, the jacket 540 may include materials that have a white or bright color, or a contrasting color pattern (e.g., a painted pattern). Further, in some embodiments, the jacket 540 may include a material or coating that reflects ultra-violet (UV) light, glows, or a combination of UV reflection and glowing.

In addition, the tether 500 may further include a braided layer (not shown). In some embodiments, the braided layer may be included as part of the jacket 540. Moreover, in some embodiments, the braided layer may be located over the outer surface 544 of the jacket 540. Further, in some embodiments, the braided layer may be located between the plurality of electrical conductors 530 and the jacket 540. Further still, in some embodiments, the jacket 540 may take the form of or be similar in form to a braided layer.

Further, the tether 500 may further include at least one reinforcing element (not shown). In some embodiments, the reinforcing element may improve torsional stiffness of the tether 500 and/or resistance to tension-induced torque of the tether 500.

The reinforcing element may take various different forms in various different embodiments. In some embodiments, the reinforcing element may be helically wound around the axial rod 512. In some such embodiments, when the axial rod 512 comprises a pultruded fiber rod, the reinforcing layer may be helically wound around the axial rod 512 during pultrusion of the axial rod 512. Moreover, in some embodiments, the reinforcing element may be disposed between the first interstices 570 and/or the second interstices 580. Further, the reinforcing element may be incorporated in the compliant layer 520 and/or the jacket 540.

Further, the reinforcing element may comprise a variety of materials. For instance, in some embodiments, the reinforcing element may comprise carbon fiber, glass fiber, dry strength fiber (e.g., aramid, PBO, or ultra-high-molecular-weight polyethylene ("UHMW-PE")), metallic wire, or any other suitable material.

Moreover, the reinforcing element may be arranged on the tether 500 in variety of ways. For instance, in some embodiments, the reinforcing element may be wound in a first direction. With this arrangement, the reinforcing element may improve torque resistance of the tether 500 in the first direction. Further, in some embodiments, the reinforcing element may be braided. With this arrangement, the reinforcing element may symmetrically improve torque resistance of the tether 500. Further still, in some embodiments, the reinforcing element may be asymmetrically braided. Yet further, in some embodiments, the reinforcing element may be wound in separate, non-intertwining layers.

Further, in some examples, the tether 500 may further include at least one fiber optic cable and/or a coaxial conductor (not shown). The fiber optic cable or coaxial conductor may be configured for communication between an aerial vehicle (e.g., the aerial vehicle 330) and a ground station (e.g., the ground station 410). In some embodiments, the fiber optic cable or coaxial cable may be wound around the outer surface 524 of the compliant layer 520 in the same or similar way as the plurality of electrical conductors 530 are wound around the outer surface 524 of the compliant layer 520. In addition, in some embodiments, the fiber optic cable may be included in the axial rod 512. Moreover, in some embodiments, the fiber optic cable may be encased in a metallic tube, such as stainless steel. Further, in some embodiments, the fiber optic cable encased in the metallic tube may be included in the axial rod 512.

Figure 6A:
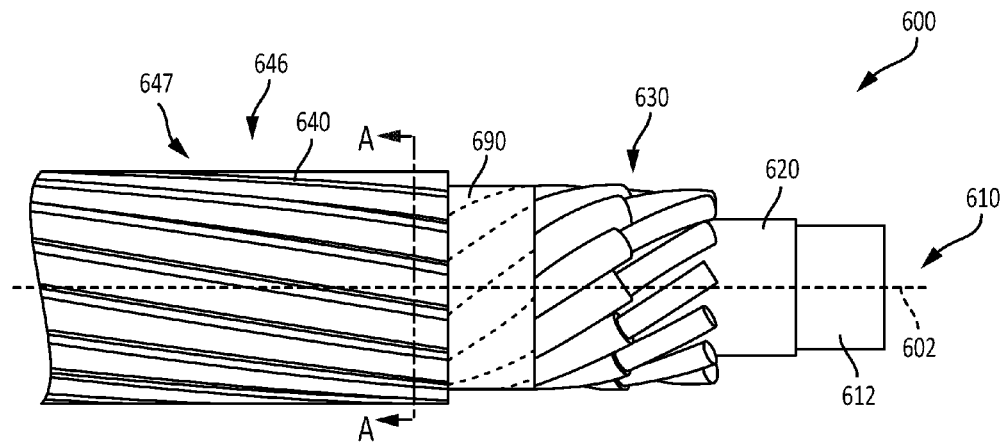
FIG. 6a depicts a tether, according to an example embodiment.
Figure 6B:
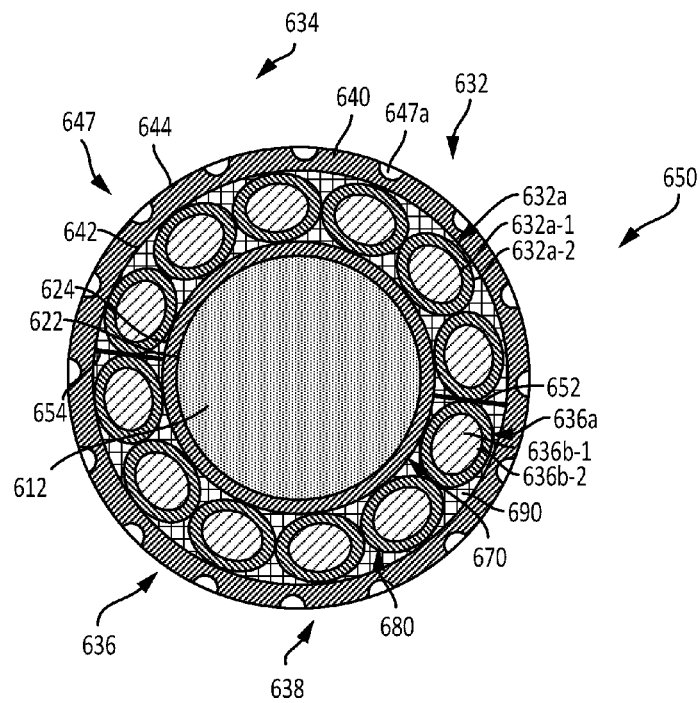
FIG. 6b depicts the tether shown in FIG. 6a in cross-section, according to an example embodiment.

In some implementations, a tether may include a jacket that has a plurality of drag-affecting surface features. FIG. 6a depicts a tether 600, according to an example embodiment. Further, FIG. 6b depicts the tether 600 in cross-section along line AA, according to an example embodiment. The tether 120 and/or the tether 220 may take the form of or be similar in form to the tether 600. For purposes of illustration only, the tether 600 in FIG. 6a is shown with a portion of some components removed in the same way as the tether 500 in FIG. 5a.

As shown in FIG. 6a, the tether 600 may include, among other components, a core 610, a compliant layer 620, a plurality of electrical conductors 630, a jacket 640, and a fill material 690. In the illustrated example, the plurality of electrical conductors 630 may have twelve electrical conductors, where a first group of electrical conductors 632 may have six electrical conductors and a second group of electrical conductors 636 may have six electrical conductors. Components in FIGS. 6a and 6b similar to those in FIGS. 5a and 5b may be of the same configuration and function in a similar manner.

The jacket 640 may include an inner surface 642 that covers at least a portion of the plurality of electrical conductors 630 and an outer surface 644 opposite the inner surface 642. The outer surface 644 of the jacket 640 may comprise a plurality of drag-affecting surface features 646. The plurality of drag-affecting surface features 646 may be configured to affect drag of the tether 600. As one example, the plurality of drag-affecting surface features 646 may reduce the drag of the tether 600. As another example, the plurality of drag-affecting surface features 646 may increase the drag of the tether 600.

The plurality of drag-affecting surface features 646 may take various different forms in various different embodiments. In some embodiments, the plurality of drag-affecting surface features 646 may comprise a plurality of flutes 647

(e.g., grooves) in the outer surface 644 of the jacket 640. As shown in FIG. 6b, in some embodiments, the plurality of flutes 647 may include sixteen flutes having a pitch of 500 millimeters (flute 647a of the plurality of flutes 647 labeled in FIG. 6b). However, in other embodiments, the plurality of flutes 647 may include more or less than sixteen flutes and/or the plurality of flutes 647 may have a different pitch. In addition, in some embodiments, each flute of the plurality of flutes 647 may have the same depth and same radius. However, in other embodiments, at least two flutes of the plurality of flutes 647 may have a different depth and/or a different radius. As one example, flute 647a may have a depth of 0.6 millimeters and a radius of 0.8 millimeters. Further, in some embodiments, at least one flute of the plurality of flutes 647 may have a circular cross-section shape, a triangular cross-section shape, a rectangular cross-section shape, or a varying cross-section shape. In addition, in some embodiments, each flute of the plurality of flutes 647 may have the same cross-section shape. However, in other embodiments, at least two flutes of the plurality of flutes 647 may have a different cross-section shape.

Moreover, in some embodiments, the plurality of drag-affecting surface features 646 may include a plurality of strakes (e.g., ridges) protruding from the outer surface 644 of the jacket 640, a plurality of dimples, tape with riblets, or any other textured shape/material that can affect drag of the tether 600. In addition, the plurality of surface features 646 may include one or more of flutes, strakes, dimples, and tape with riblets. With this arrangement, the plurality of surface features 646 may comprise a combination of flutes, strakes, dimples and/or tape with riblets.

The plurality of drag-affecting surface features 646 may be arranged on the outer surface 644 of the jacket 640 in a variety of ways. For instance, in some embodiments, the plurality of drag-affecting surface features 646 may be disposed on the outer surface 644 along the long axis 602 of the tether 600. Further, in some embodiments, the plurality of drag-affecting surface features 646 may be disposed on the outer surface 644 in a helical pattern. In some such embodiments, the helical pattern may be based on a fixed helical angle (e.g., helical angle 514) and/or a varying helical angle. In some embodiments, the fixed or varying helical angle of the plurality of drag-affecting surface features 646 may be different than or the same or similar as the helical angle 514. Further still, in some embodiments, the plurality of drag-affecting surface features 646 may be disposed on the outer surface 644 in an oscillating path. Moreover, in some embodiments, at least a portion of the plurality of drag-affecting surface features 646 may be disposed on the outer surface 644 along the long axis 602 of the tether 600, in a helical pattern with a fixed or varying helical angle, or in an oscillating path. With this arrangement, the plurality of drag-affecting surface features 646 may comprise surface features arranged on the outer surface 644 in a combination of being disposed along the long axis 602 of the tether 600, in a helical pattern with a fixed or varying helical angle, and/or in an oscillating path.

In some embodiments, when the jacket 640 is extruded, the plurality of surface drag-affecting features 646 may be manufactured during the extrusion of the jacket 640. Moreover, in some embodiments, the plurality of drag-affecting surface features 646 may be added to and/or removed from the outer surface 644 of the jacket 640 after the jacket 640 is manufactured.

The tether 600 may further include a braided layer, reinforcing element, and/or at least one fiber optic cable and/or coaxial cable (not shown) in the same or similar way as tether 500 may include a braided layer, reinforcing element, and/or at least one fiber optic cable and/or coaxial cable.

Although example tethers described above include a compliant layer, in other examples, a tether may not include a compliant layer. In such examples, a plurality of electrical conductors (e.g., the plurality of electrical conductors 530) may be wound around the core (e.g. the core 510).

Moreover, although example tethers described above include a first group of electrical conductors and a second group of electrical conductors, in other examples, tethers may include more than two groups of electrical conductors. For instance, in some embodiments, a tether may include a first group of electrical conductors defining a first electrical path, a second group of electrical conductors defining a second electrical path that is different from the first electrical path, and a third group of electrical conductors defining a third electrical path that is different from the first and second electrical paths. The first group of electrical conductors may be located along a first portion of an outer surface (e.g., the outer surface 524) of a compliant layer (e.g., the compliant layer 520), such that a cross-section of the first group of electrical conductors defines a first arc along the first portion of the outer surface, the second group of electrical conductors may be located along a second portion of the outer surface of the compliant layer, such that a cross-section of the second group of electrical conductors defines a second arc along the second portion of the outer surface, and the third group of electrical conductors may be located along a third portion of the outer surface of the compliant layer, such that a cross-section of the third group of electrical conductors defines a third arc along the third portion of the outer surface. In some embodiments, the first portion of the outer surface may comprise a first third of a circumference of the compliant layer, the second portion of the outer surface may comprise a second third of the circumference of the compliant layer, and the third portion of the outer surface may comprise a third of the circumference of the compliant layer.

In some embodiments, the first group of electrical conductors may be configured to carry a first phase of electrical power, the second group of electrical conductors may be configured to carry a second phase of electrical power that is different from the first phase of electrical power, and the third group of electrical conductors may be configured to carry a third phase of electrical power that is different from the first and second phases of electrical power.

Further, although example tethers described above may include a fill material that fills first interstices and second interstices, in other examples, a fill material may not fill the first interstices and/or the second interstices. In addition, in some examples, a tether may not include a fill material.

Figure 7:
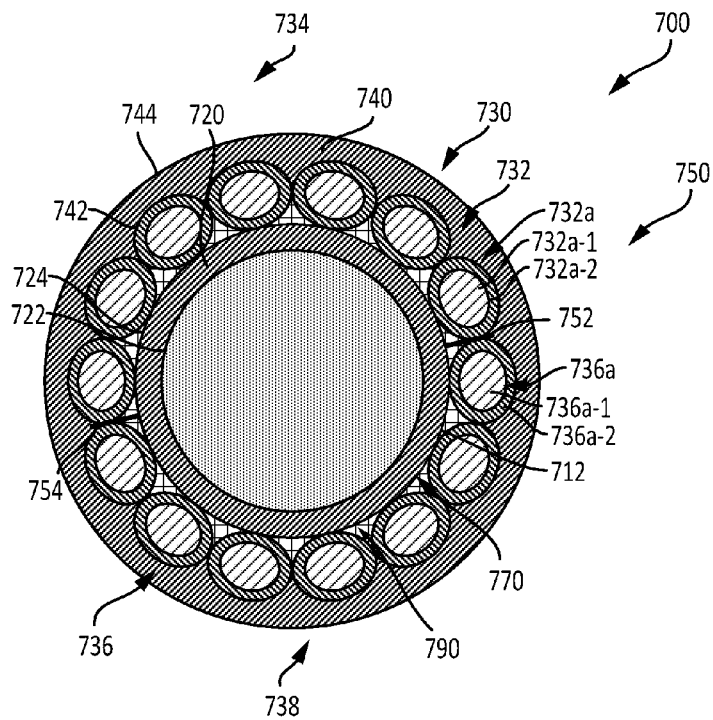
FIG. 7 depicts a tether, according to an example embodiment.

FIG. 7 depicts a tether 700, according to an example embodiment. As shown in FIG. 7, the tether 700 includes, among other components, a compliant layer 720, a plurality of electrical conductors 730, a jacket 740, and first interstices 770 located between the plurality of conductors 730 and the compliant layer 720. Components in FIG. 7 similar to those in FIGS. 5a to 5b may be of the same configuration and function in a similar manner.

In some embodiments, the first interstices 770 may not be filled. However, in other embodiments, a fill material 790 similar to the fill material 590 may fill the first interstices 770. Moreover, as shown in FIG. 7, the jacket 740 may include an inner surface 742 that covers the plurality of electrical conductors 730, such that the jacket 740 fills interstices between adjacent electrical conductors and the jacket 740.

Figure 8:
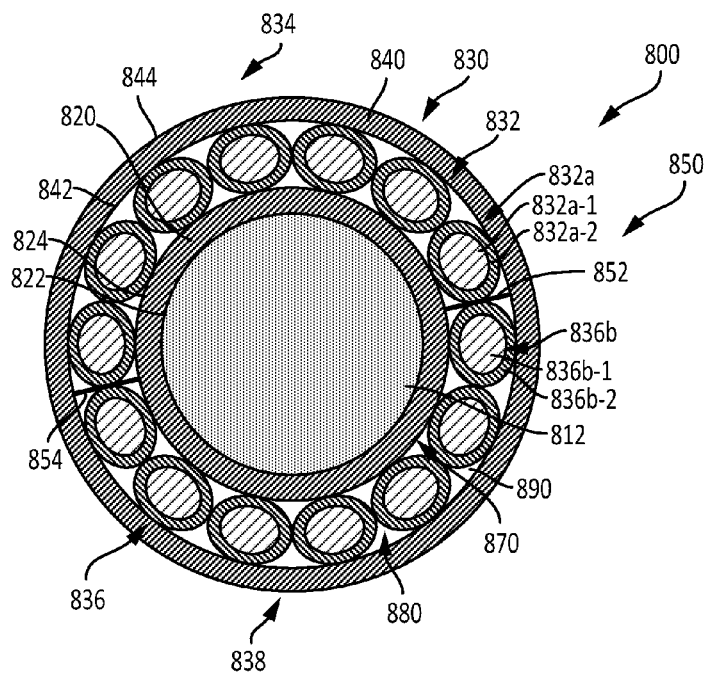
FIG. 8 depicts a tether, according to an example embodiment.

FIG. 8 depicts a tether 800, according to an example embodiment. As shown in FIG. 8, the tether 800 includes, among other components, a compliant layer 820, a plurality of electrical conductors 830, a jacket 840, first interstices 870 located between the plurality of conductors 830 and the compliant layer 820, and second interstices 880 located between the plurality of conductors 830 and the jacket 840. Components in FIG. 8 similar to those in FIGS. 5a to 5b may be of the same configuration and function in a similar manner. In some embodiments, the first interstices 870 and the second interstices 880 may not be filled. The second interstices 880 may not be filled in a variety of ways. For instance, in some embodiments, a tube extrusion crosshead may be used, or a taping layer may be wound over the plurality of electrical conductors 830 before the jacket 840 is extruded over the plurality of electrical conductors 830. In some embodiments, the taping layer may comprise mylar.

Figure 9A:
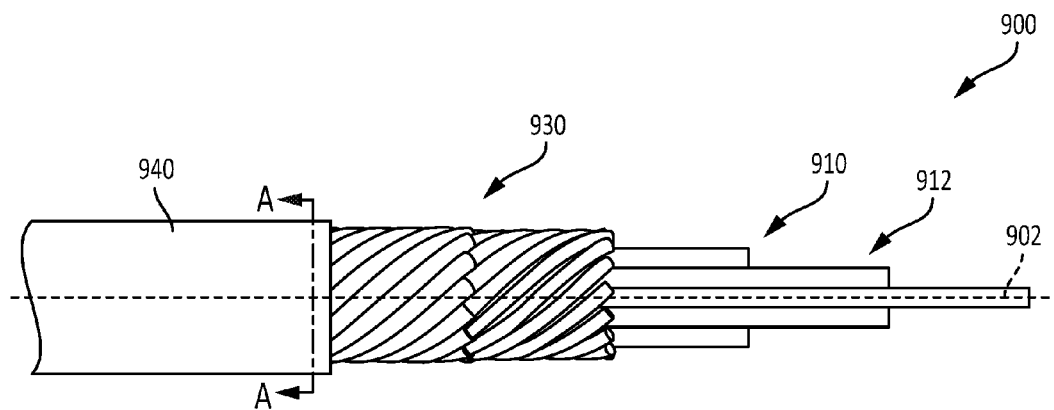
FIG. 9a depicts a tether, according to an example embodiment.

In some implementations, a tether may include a core comprising a plurality of core elements. FIG. 9a depicts a tether 900, according to an example embodiment. The tether 120 and/or the tether 220 may take the form of or be similar in form to the tether 900.

As shown in FIG. 9a, the tether 900 may include a core 910, a plurality of electrical conductors 930 wound around the core 910, and a jacket 940. The tether 900 may include a long axis 902. Components in FIG. 9a similar to those in FIG. 5a may be of the same configuration and function in a similar manner. For purposes of illustration only, the tether 900 in FIG. 9a is shown with a portion of some components removed to illustrate the arrangement of components in the tether 900 in a similar way as the tether 500 in FIG. 5a.

The core 910 may be a cabled core and may comprise a plurality of core elements 912. The plurality of core elements 912 may provide a significant contribution to the tensile strength and/or shear strength of the tether 900 in a similar way as the axial rod 512, improve resistance of the tether 900 to fatigue loads while an AWT (e.g., the AWT 100 and/or AWT 200) is in operation in a similar way as the axial rod 512, and improve resistance of various components of the tether 900 to fatigue loads, such as the plurality of electrical conductors 930, in a similar way as the axial rod 512.

Figure 9B:
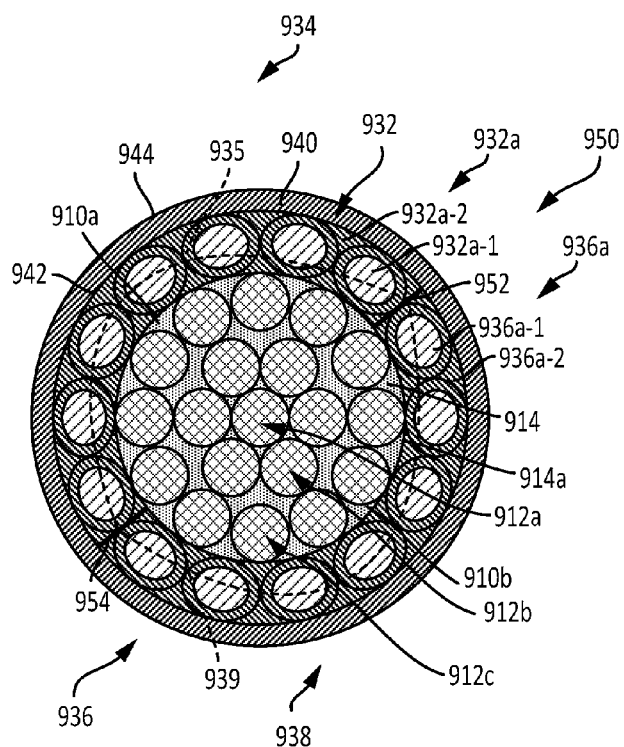
FIG. 9b depicts the tether shown in FIG. 9a in cross-section, according to an example embodiment.

The plurality of core elements 912 may take various different forms in various different embodiments. FIG. 9b depicts the tether 900 in cross-section along the line AA, according to an example embodiment. As shown in FIG. 9b, the plurality of core elements 912 may include a number of rods arranged in three layers: a first layer 912a, a second layer 912b, and a third layer 912c. In particular, as shown in FIG. 9b, the first layer 912a may include one rod, the second layer 912b may include six rods located around the first layer 912a, and the third layer 912c may include twelve rods located around the second layer 912b. With this arrangement, the plurality of core elements 912 may include nineteen rods.

However, in other examples, the plurality of core elements 912 may include more or less than nineteen rods. In addition, in other examples, the plurality of core elements 912 may be arranged in more or less than three layers.

In some embodiments, the plurality of core elements 912 may comprise any of the materials that the axial rod 512 may comprise. For instance, in some embodiments, at least one core element of the plurality of core elements 912 may include carbon fiber. Moreover, in some embodiments, at least one core element of the plurality core elements 912 may have preferred dimension (e.g., diameter) of 3.5 millimeters. In addition, in some embodiments, the plurality of core elements 912 may comprise any cross-section shapes of the axial rod 512. For instance, in some embodiments, at least one core element of the plurality of core elements 912 may comprise a circular cross-section shape. For use with AWTs, the overall tether 900 diameter may be around 27 millimeters.

Further, in some embodiments, each core element of the plurality of core elements 912 may have the same material, same dimension, and/or same cross-section. However, in other embodiments, at least two core elements of the plurality of core elements 912 may have different materials, dimensions, and/or cross-section shapes. For instance, in some embodiments, at least one core element in the plurality of core elements 912 may take the form of or be similar in form to the axial rod 512 and other core elements in the plurality of core elements 912 may be wound around the at least one core element.

Yet further, in some embodiments, at least one core element of the plurality of core elements 912 may be helically wound around another core element of the plurality of core elements 912 in a similar way as the plurality of electrical conductors 530 are helically wound around the core 510. Moreover, in some embodiments, at least two core elements of the plurality of core elements 912 may be wound around another core element of the plurality of core elements 912 with a reverse oscillating lay.

Further, the number of core elements in the plurality of core elements 912 and/or arrangement of core elements in layers in the plurality of core elements 912 may be selected based at least in part on a weight of the tether 900 and/or a predetermined loading of the tether, such as a predetermined fatigue loading of the tether 900.

In some embodiments, the core 910 may further include a capping layer 914 surrounding and/or binding the plurality of core elements 912 and may additionally separate the plurality of core elements 912 from the plurality of electrical conductors 930. In addition, the capping layer 914 may reduce a contact pressure between at least one core element of the plurality of core elements 912 and at least one conductor of the plurality of electrical conductors 930. In some embodiments, the capping layer 914 may have a thickness that is less than a thickness of the compliant layer 520. Moreover, in some embodiments, the capping layer 914 may have a hardness that is greater than a hardness of the compliant layer 520.

The plurality of electrical conductors 930 may have a similar arrangement and function in a similar manner as the plurality of electrical conductors 530. For instance, the plurality of electrical conductors 930 may be configured to transmit electricity in the same or similar way as the plurality of electrical conductors 530.

Moreover, as shown in FIG. 9a, the plurality of electrical conductors 930 may be wound around the core 910. In some embodiments, the plurality of electrical conductors 930 may be wound around the plurality of core elements 912 and/or the capping layer 914. The plurality of electrical conductors 930 may be wound around the plurality of core elements 912 and/or the capping layer 914 in the same or similar way as the plurality of core elements 530 is wound around the compliant layer 520.

Further, as shown in FIG. 9b, in some embodiments, the plurality of electrical conductors 930 may include a first group of electrical conductors 932 and a second group of electrical conductors 936. The first group of electrical conductors 932 may define a first electrical path 934, and the second group of electrical conductors 936 may define a second electrical path 938 that is different from the first electrical path 934. Components in FIG. 9b similar to those in FIG. 5b may be of the same configuration and function in a similar manner.

In some embodiments, the first group of electrical conductors 932 may be located along a first portion 910a of the core 910, such that a cross-section of the first group of electrical conductors 932 defines a first arc 935 along the first portion of the core 910. Further, in some such embodiments, the first arc 935 along the first portion 910a of the core 910 may take the form of a semi-circle or a portion of a circle. In some embodiments, the first portion 910a may be a portion of the plurality of core elements 912 or the capping layer 914. The first portion 910a may take the form of or be similar in form to the first portion 524a, and the first arc 935 may take the form of or be similar in form to the first arc 535. In some embodiments, the first portion 910a may comprise a first half of a circumference of the plurality of core elements 912 or the capping layer 914.

Moreover, in some embodiments, the second group of electrical conductors 936 may be located along a second portion 910b of the core 910, such that a cross-section of the second group of electrical conductors 936 defines a second arc 939 along the second portion 910b of the plurality of core elements 930. Further, in some embodiments, the second arc 939 along the second portion 910b of the core 910 may take the form of a semi-circle or a portion of a circle. Yet further, in some embodiments, the second arc 939 may be substantially symmetrical to the first arc 935. In some embodiments, the second portion 910b may be a portion of the plurality of core elements 912 or the capping layer 914. The second portion 910b may take the form of or be similar in form to the second portion 524b, and the second arc 939 may take the form of or be similar in form to the second arc 539. In some embodiments, the second portion 910b may comprise a second half of the circumference of the plurality of core elements 912 or the capping layer 914.

The electrical conductors of the plurality of the electrical conductors 930 may take the form of or be similar in form to the electrical conductors 532a-g and 536a-g of the plurality of electrical conductors 530. With this arrangement, the plurality of electrical conductors 930 may include fourteen conductors, with seven conductors in the first group of electrical conductors 932 and seven conductors in the second group of electrical conductors 934. In some embodiments, each of the electrical conductors of the plurality of electrical conductors 930 may be individually insulated. Moreover, in some embodiments, at least one insulation layer may cover the electrical conductors of the plurality of electrical conductors 930. Further, in some embodiments, the insulation layers of the electrical conductors may be located between the core 910 and the inner surface of the jacket 942 (insulating layers 932a-2, 936a-2 labeled in FIG. 9b). The insulating layers may comprise any of the materials that the insulating layer 532a-2 comprises. For instance, in some embodiments, the insulating layers may comprise Tefzel and/or EPR.

For instance, in some embodiments, the first group of electrical conductors 932 and the second group of electrical conductors 934 may be configured to operate differently in the same or similar way as the first group of electrical conductors 532 and the second group of electrical conductors 536 are configured to operate differently. In particular, in an AC power transmission arrangement, the first group of electrical conductors 932 may be configured to carry a first phase of electrical power along the first electrical path 934, and the second group of electrical conductors 936 may be configured to carry a second phase of electrical power along the second electrical path 938 that is different from the first phase of electrical power. Moreover, in a DC power transmission arrangement, the first group of electrical conductors 932 may be configured to operate at a first potential along the first electrical path 934, and the second group of electrical conductors 936 may be configured to operate at a second potential along the second electrical path 936 that is different from the first potential.

In some embodiments, the tether 900 may further include one or more separators 950 located between the first group of electrical conductors 932 and the second group of electrical conductors 936. The separators 950 may take the form of or be similar in form to the separators 550. For instance, in some embodiments, the separators 950 may comprise two rods 952, 954 that each extend between the plurality of core elements 912 and the jacket 940. The rods 952, 954 may insulate the first group of electrical conductors 932 from the second group of electrical conductors 936. The rods 952, 954 may take the form of or be similar in form to the two rods 552, 554.

In addition, in some embodiments, the capping layer 914 may comprise one or more separators that functions in a similar manner as the separators 950. With this arrangement, the separator(s) may be a part of the capping layer 914. For instance, in some such embodiments, the separator(s) may comprise two features that each extend between an outer surface 914a of the capping layer 914 and an inner surface 942 of the jacket 940 in a similar way as the rods 952, 954 extend between the plurality of core elements 912 and the jacket 940. The two features may insulate the first group of electrical conductors 932 from the second group of electrical conductors 936 in a similar way as the rods 952, 954 insulate the first group of electrical conductors 932 from the second group of electrical conductors 936. Moreover, in some embodiments, when the plurality of conductors 930 is helically wound around the outer the capping layer 914, the separator(s) may also be helically wound around the outer surface 914a of the capping layer 914.

In some such embodiments, the two features of the separator may comprise two strakes, walls, and/or ridges, or a combination of strakes, walls, or ridges. Moreover, in some embodiments, the two features may be formed in the capping layer 914 as the capping layer 914 is formed. Further, in some embodiments, the two features may be formed in the capping layer 914 after the capping layer 914 is formed.

Moreover, in some embodiments, the plurality of electrical conductors 930 may be helically wound around the core 910, such that (i) first interstices (not shown) are located between adjacent electrical conductors and the core 910 and (ii) second interstices (not shown) are located between adjacent electrical conductors and the jacket 940. The first interstices may take the form of or be similar in form to the first interstices 570, and the second interstices may take the form of or be similar in form to the second interstices 580. In some such embodiments, the tether 900 may further include a fill material to fill the first interstices and/or the second interstices. The fill material may take the form of or be similar in form to the fill material 590.

Further, in some embodiments, first interstices may be located between adjacent electrical conductors and the plurality of core elements 912 or the capping layer 914.

Moreover, as shown in FIG. 9a, the jacket 940 may surround the plurality of electrical conductors 930. The jacket 940 may include the inner surface 942 that covers at least a portion of the plurality of electrical conductors 930, and an outer surface 944 that is opposite the inner surface 942. The jacket 940 may take the form of or be similar in form to the jacket 540 and/or jacket 640.

For instance, in some embodiments, the outer surface 944 may include a plurality of draft-affecting surface features (not shown). The plurality of drag-affecting surface features may take the form of or be similar in form to the plurality of drag-affecting surface features 646. In addition, the jacket 940 may comprise any of the materials and have any of the dimensions of the jacket 540 and/or the jacket 640.

Further, in some embodiments, when the tether 900 includes the first interstices and second interstices, the jacket 940 may fill the second interstices. In addition, in some embodiments, when the tether 900 includes the first and second interstices, the first interstices and/or the second interstices may not be filled.

The tether 900 may further include a braided layer, reinforcing element, and/or at least one fiber optic cable and/or coaxial cable (not shown) in the same or similar way as tether 500 may include a braided layer, reinforcing element, and/or at least one fiber optic cable and/or coaxial cable.

Figure 10A:
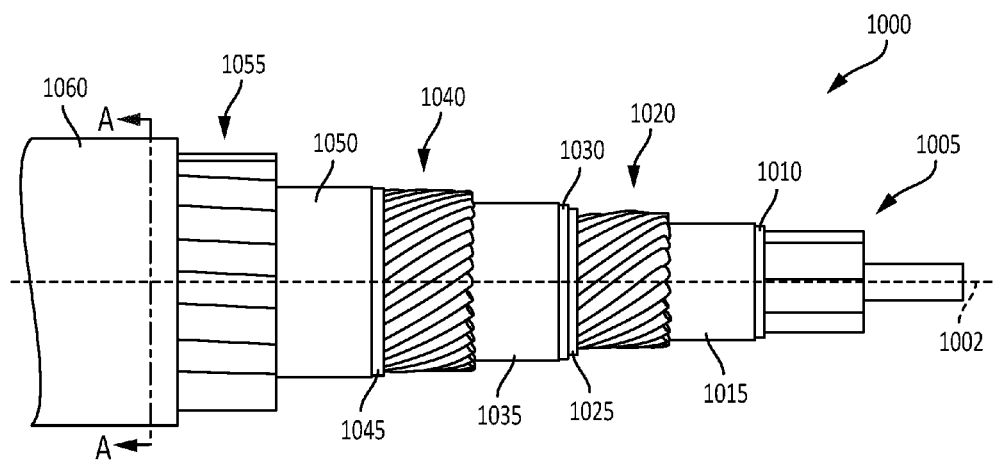
FIG. 10a depicts a tether, according to an example embodiment.

Further, in some implementations, a tether may include a first plurality of electrical conductors and a second plurality of electrical conductors. FIG. 10a depicts a tether 1000, according to an example embodiment. The tether 120 and/or the tether 220 may take the form of or be similar in form to the tether 1000. As shown in FIG. 10a, the tether 1000 may include a plurality of core elements 1005, a first insulating layer 1010 surrounding the plurality of core elements 1005, a first semi-conducting layer 1015 surrounding the first insulating layer 1010, a first plurality of electrical conductors 1020 located around the first semi-conducting layer 1015, a second semi-conducting layer 1025 surrounding the first plurality of electrical conductors 1020, a second insulating layer 1030 surrounding the second semi-conducting layer 1025, a third semi-conducting layer 1035 surrounding the second insulating layer 1030, a second plurality of electrical conductors 1040 located around the third semi-conducting layer 1035, a fourth semi-conducting layer 1045 surrounding the second plurality of electrical conductors 1040, a third insulating layer 1050 surrounding the fourth semi-conducting layer 1045, a plurality of strength elements 1055 located around the third insulating layer 1050, and a jacket 1060 surrounding the plurality of strength elements 1055. The tether may include a long axis 1002. For purposes of illustration only, the tether 1000 in FIG. 10a is shown with a portion of some components removed to illustrate the arrangement of components in the tether 1000 in a similar way as the tether 500 in FIG. 5a.

Figure 10B:
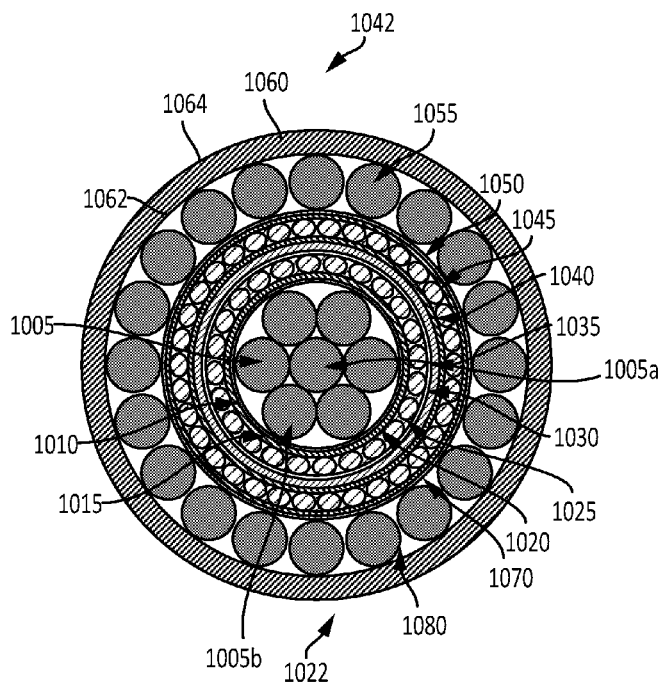
FIG. 10b depicts tether shown in FIG. 10a in cross-section, according to an example embodiment.

FIG. 10b depicts the tether 1000 in cross-section along the line AA in FIG. 10a, according to an example embodiment. As shown in FIG. 10b, the plurality of core elements 1005 may include a number of rods arranged in two layers: a first layer 1005a and a second layer 1005b. In particular, the first layer 1005b may include one rod, and the second layer 1005b may include six rods. With this arrangement, the plurality of core elements 1005 may include seven rods. However, in other examples, the plurality of core elements 1005 may include more or less than seven rods arranged in more or less than two layers.

In addition, as shown in FIG. 10b, the plurality of strength elements 1055 may include a number of rods arranged in one layer. In particular, the plurality of strength elements 1055 may include twenty one rods. However, in other examples, the plurality of strength elements 1055 may include more or less than twenty one rods arranged in one layer or more than one layer.

The plurality of core elements 1005 and the plurality of strength elements 1055 may provide a significant contribution to the tensile strength and/or shear strength of the tether 1000 in a similar way as the axial rod 512 and the plurality of core elements 912, improve resistance of the tether 1000 to fatigue loads while an AWT (e.g., the AWT 100 and/or AWT 200) is in operation in a similar way as the axial rod 512 and the plurality of core elements 912, and improve resistance of various components of the tether 1000 to fatigue loads, such as the first plurality of electrical conductors 1020 and second plurality of electrical conductors 1030, in a similar way as the axial rod 512 and the plurality of core elements 912.

The plurality of core elements 1005 and the plurality of strength elements 1055 may take the form of or be similar in form to the axial rod 512 and/or the plurality of core elements 912. For instance, the plurality of core elements 1005 and the plurality of strength elements 1055 may comprise any of the materials that the axial rod 512 and/or the plurality of core elements 912 comprises. In addition, in some embodiments, the plurality of core elements 1005 and the plurality of strength elements 1055 may comprise any cross-section shapes of the axial rod 512 and/or the plurality of core elements 912. For instance, in some embodiments, at least one core element of the plurality of core elements 1005 and the plurality of strength elements 1055 may comprise a circular cross-section shape.

Further, in some embodiments, each core element of the plurality of core elements 1005 and/or the plurality of strength elements 1055 may have the same material, same dimension, and/or same cross-section. However, in other embodiments, at least two core elements of the plurality of core elements 1055 may have different materials, dimensions, and/or cross-section shapes; at least two strength elements of the plurality of strength elements 1055 may have different materials, dimensions, and/or cross-section shapes, or at least one core element of the plurality of core elements 1055 may have a different material, dimension, and/or cross-section shape from at least one strength element of the plurality of strength elements 1055.

Yet further, in some embodiments, at least one core element of the plurality of core elements 1005 may be helically wound around another core element of the plurality of core elements 1005 in a similar way as the plurality of electrical conductors 530 are helically wound around the core 510. Moreover, in some embodiments, at least two core elements of the plurality of core elements 1005 may be wound around another core element of the plurality of core elements 1005 with a reverse oscillating lay in a similar way as the plurality of core elements 912.

Further, the number of core elements in the plurality of core elements 1005, the number of strength elements in the plurality of strength elements 1055, arrangement of core elements in layers in the plurality of core elements 1005, and/or arrangement of strength elements in layers in the plurality of strength elements 1055 may be selected based at least in part on a weight of the tether 1000 and/or a predetermined loading of the tether, such as a predetermined fatigue loading of the tether 1000.

The first insulating layer 1010, the second insulating layer 1030, and the third insulating layer 1050 may take the form of or be similar in form to the insulating layer 532a-2, the insulating layer 932a-2, and/or the insulating layer 936a-2. For instance, the first insulating layer 1010, the second insulating layer 1030, and the third insulating layer 1050 may comprise any of the materials that the insulating layer 932a-2, insulating layer 532a-2, and/or the insulating layer 936a-2 may comprise.

Moreover, in some embodiments, first insulating layer 1010, the second insulating layer 1030, and the third insulating layer 1050 may each comprise the same material and have the same dimensions. However, in other embodiments, at least two of the first insulating layer 1010, the second insulating layer 1030, and the third insulating layer 1050 may comprise a different material or have different dimensions.

In some embodiments, the first semi-conducting layer 1015, the second semi-conducting layer 1020, third semi-conducting layer 1035, and fourth semi-conducting layer 1040 may each comprise a polymer composite or any other semi-conducting material. Moreover, in some embodiments, the first semi-conducting layer 1015, the second semi-conducting layer 1020, third semi-conducting layer 1035, and fourth semi-conducting layer 1040 may comprise the same material and have the same dimensions. However, in other embodiments, at least two of the first semi-conducting layer 1015, the second semi-conducting layer 1020, third semi-conducting layer 1035, and fourth semi-conducting layer 1040 may comprise a different material or have different dimensions.

The first plurality of electrical conductors 1020 and the second plurality of electrical conductors 1040 may have a similar arrangement and function in a similar manner as the plurality of electrical conductors 530 and/or the plurality of electrical conductors 930. For instance, the first plurality of electrical conductors 1020 and the second plurality of electrical conductors 1040 may be configured to transmit electricity in the same or similar way as the plurality of electrical conductors 530 and/or the plurality of electrical conductors 930. In some embodiments, the first plurality of electrical conductors 1020 and the second plurality of electrical conductors 1040 may have a round shape or a rectangular shape.

The first plurality of electrical conductors 1020 may define a first electrical path 1022, and the second plurality of electrical conductors 1040 may define a second electrical path 1042 that is different from the first electrical path 1022.

Moreover, as shown in FIG. 10b, the first plurality of electrical conductors 1020 may be wound around the first semi-conducting layer 1015 (e.g., an outer surface of the first semi-conducting layer 1015), and the second plurality of electrical conductors 1040 may be wound around the third semi-conducting layer 1035 (e.g., an outer surface of the third semi-conducting layer 1035). The first plurality of electrical conductors 1020 may be wound around the first semi-conducting layer 1015 in the same or similar way as the plurality of electrical conductors 530 is wound around the outer surface 524 of the compliant layer 520 and/or the plurality of electrical conductors 930 is wound around the plurality of core elements 912, and the second plurality of electrical conductors 1040 may be wound around the third semi-conducting layer 1035 in the same or similar way as the plurality of electrical conductors 530 is wound around the outer surface 524 of the compliant layer 520 and/or the plurality of electrical conductors 930 is wound around the plurality of core elements 912.

Further, the first plurality of electrical conductors 1020 and the second plurality of electrical conductors 1040 may be configured to operate differently in the same or similar way as the first group of electrical conductors 532 and the second group of electrical conductors 534 are configured to operate differently and/or the first group of electrical conductors 932 and the second group of electrical conductors 934 are configured to operate differently. In particular, in an AC power transmission arrangement, the first plurality of electrical conductors 1020 may be configured to carry a first phase of electrical power along the first electrical path 1022, and the second plurality of electrical conductors 1040 may be configured to carry a second phase of electrical power along the second electrical path 1042 that is different from the first phase of electrical power. Moreover, in a DC power transmission arrangement, the first plurality of electrical conductors 1020 may be configured to operate at a first potential along the first electrical path 1022, and the second plurality of electrical conductors 1040 may be configured to operate at a second potential along the second electrical path 1042 that is different from the first potential.

The electrical conductors of the first plurality of electrical conductors 1020 and the second plurality of electrical conductors 1040 may take the form of or be similar in form to the electrical conductors of the plurality of electrical conductors 530 and/or the electrical conductors of the plurality of electrical conductors 930. With this arrangement, the first plurality of electrical conductors 1020 may include twenty four electrical conductors, and the second plurality of electrical conductors 1040 may include thirty four electrical conductors.

Moreover, in some embodiments, the first plurality of electrical conductors 1020 and/or the second plurality of electrical conductors 1040 may be separated into a first group of electrical conductors and a second group of electrical conductors similar to the plurality of electrical conductors 530 and/or the plurality of electrical conductors 930. With this arrangement, the first and second groups of electrical conductors may be configured to operate differently in the same or similar way as the first and second group of electrical conductors 532, 536 and/or the first and second group of electrical conductors 932, 936. Moreover, in some such embodiments, the tether 1000 may further include one or more separators that may take the form of or be similar in form to and function in a similar manner as the separators described above with respect to FIGS. 5a to 5b and 9a to 9b.

Moreover, in some embodiments, the second plurality of core elements 1055 may be helically wound around the third insulating layer 1050, such that (i) first interstices 1070 are located between adjacent core elements and the third insulating layer 1050 and (ii) second interstices 1080 are located between adjacent core elements and the jacket 1060. The first interstices 1070 may take the form of or be similar in form to the first interstices 570, and the second interstices 1080 may take the form of or be similar in form to the second interstices 580. In some such embodiments, the tether 1000 may further include a fill material (not shown) to fill the first interstices 1070 and/or the second interstices 1080. The fill material may take the form of or be similar in form to the fill material 590.

Moreover, the jacket 1060 may include an inner surface 1062 that covers at least a portion of the second plurality of core elements 1055, and an outer surface 1064 that is opposite the inner surface 1042. The jacket 1060 may take the form of or be similar in form to the jacket 540, jacket 640, and/or jacket 940.

For instance, in some embodiments, the outer surface 1064 may include a plurality of drag-affecting surface features (not shown). The plurality of surface features may take the form of or be similar in form to the plurality of drag-affecting surface features 646. In addition, the jacket 1040 may comprise any of the materials and have any of the dimensions of the jacket 540, jacket 640, and/or jacket 940.

Further, in some embodiments, when the tether 1000 includes the first interstices 1070 and second interstices 1080, the jacket 1060 may fill the second interstices 1080. In addition, in some embodiments, when the tether 1000 includes the first interstices 1070 and second interstices 1080, the first interstices 1070 and/or the second interstices 1080 may not be filled.

Although examples of the tether 1000 described above include the first semi-conducting layer 1015, the second semi-conducting layer 1025, the third semi-conducting layer 1035, and the fourth semi-conducting layer 1045, in other examples, a tether may not include semi-conducting layers. Moreover, although examples of the tether 1000 described above include the plurality of strength elements 1055, in other examples, a tether may not include a plurality of strength elements.

For instance, in some embodiments, a tether may include a core, a first insulating layer surrounding the core, a first plurality of electrical conductors located around the first insulating layer, where the first plurality of electrical conductors defines a first electrical path, a second insulating layer surrounding the first plurality of electrical conductors, a second plurality of electrical conductors located around the second insulating layer, where the second plurality of electrical conductors defines a second electrical path that is different from the first electrical path, a third insulating layer surrounding the second plurality of electrical conductors, and a jacket surrounding the third insulating layer. The core may take the form of the core 510 and/or the core 910. With this arrangement, the core may include an axial rod or a plurality of core elements, where the axial rod may take the form of or be similar in form to the axial rod 512 and the plurality of core elements may take the form of or be similar in form to the plurality of core elements 912 and/or the plurality of core elements 1005.

In addition, the first insulating layer may take the form of or be similar in form to the first insulating layer 1010, the first plurality of electrical conductors may take the form of or be similar in form to the first plurality of electrical conductors 1020, the second insulating layer may take the form of or be similar in form to the second insulating layer 1030, the second plurality of electrical conductors may take the form of or be similar in form to the second plurality of electrical conductors 1040, the third insulating layer may take the form of or be similar in form to the third insulating layer 1050, and the jacket may take the form of or be similar in form to the jacket 1060.

Although example tethers described above may be used in AWTs, in other examples, tethers described herein may be used for other applications, including overhead transmission, aerostats, subsea and marine applications, including offshore drilling and remotely operated underwater vehicles (ROVs), towing, mining, and/or bridges, among other possibilities.

III. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A tether comprising:
   a core;
   a plurality of electrical conductors wound around the core, wherein the plurality of electrical conductors comprises:
   a first group of electrical conductors defining a first electrical path, wherein the first group of electrical conductors is located around a first portion of an outer surface of the core, such that a cross-section of the first group of electrical conductors defines a first arc around the first portion of the outer surface, wherein the first portion of the outer surface comprises a first half of a circumference of the core, and
   a second group of electrical conductors defining a second electrical path that is different from the first electrical path, wherein the second group of electrical conductors is located around a second portion of the outer surface of the core, such that a cross-section of the second group of electrical conductors defines a second arc around the second portion of the outer surface, wherein the second portion of the outer surface comprises a second half of the circumference of the core; and
   a jacket surrounding the plurality of electrical conductors.

2. The tether of claim 1, wherein the core comprises an axial rod.

3. The tether of claim 1, wherein the axial rod comprises a pultruded fiber rod.

4. The tether of claim 1, wherein the core comprises a plurality of core elements.

5. The tether of claim 1, wherein at least one electrical conductor of the plurality of electrical conductors comprises:
   an electrical conducting element; and
   an insulating layer that surrounds the electrical conducting element.

6. The tether of claim 1 further comprising a compliant layer surrounding the core, wherein the plurality of electrical conductors is wound around the compliant layer.

7. The tether of claim 6, wherein the compliant layer comprises one or more separators located between the first group of electrical conductors and the second group of electrical conductors.

8. The tether of claim 6, wherein the plurality of electrical conductors is wound around the compliant layer, such that (i) first interstices are located between adjacent electrical conductors and the compliant layer and (ii) second interstices are located between adjacent electrical conductors and the jacket, and wherein the tether further comprises a fill material located between the compliant layer and jacket, such that the fill material fills the first interstices and second interstices.

9. The tether of claim 6, wherein the plurality of electrical conductors is wound around the compliant layer, such that (i) first interstices are located between adjacent electrical conductors and the compliant layer and (ii) second interstices are located between adjacent electrical conductors and the jacket, and wherein the jacket surrounds the plurality of electrical conductors, such that the jacket fills the second interstices.

10. The tether of claim 1, wherein the first group of electrical conductors is configured to carry a first phase of electrical power, and wherein the second group of electrical conductors is configured to carry a second phase of electrical power that is different from the first phase of electrical power.

11. The tether of claim 1, wherein the first group of electrical conductors is configured to operate at a first potential, and wherein the second group of electrical conductors is configured to operate at a second potential that is different from the first potential.

12. The tether of claim 1 further comprising one or more separators located between the first group of electrical conductors and the second group of electrical conductors.

13. The tether of claim 1, wherein the jacket comprises an outer surface that comprises a plurality of drag-affecting surface features.

14. A tether comprising:
a core comprising an axial rod;
a compliant layer surrounding the core;
a plurality of electrical conductors wound around the compliant layer, wherein each electrical conductor of the plurality of electrical conductors comprises an electrical conducting element and an insulating layer that surrounds the electrical conducting element, and wherein the plurality of electrical conductors comprises:
a first group of electrical conductors defining a first electrical path, wherein the first group of electrical conductors is located along a first portion of an outer surface of the compliant layer, such that a cross-section of the first group of electrical conductors defines a first arc along the first portion of the outer surface, wherein the first portion of the outer surface comprises a first half of a circumference of the compliant layer, and a second group of electrical conductors defining a second electrical path that is different from the first electrical path, wherein the second group of electrical conductors is located along a second portion of the outer surface of the compliant layer, such that a cross-section of the second group of electrical conductors defines a second arc along the second portion of the outer surface, wherein the second portion of the outer surface comprises a second half of the circumference of the compliant layer;
one or more separators located between the first group of electrical conductors and the second group of electrical conductors; and
a jacket surrounding the plurality of electrical conductors.

15. A tether comprising:
a plurality of core elements;
a first insulating layer surrounding the plurality of core elements;
a first semi-conducting layer surrounding the first insulating layer;
a first plurality of electrical conductors located around the first conducting layer, wherein the first plurality of electrical conductors defines a first electrical path;
a second semi-conducting layer surrounding the first plurality of electrical conductors;
a second insulating layer surrounding the second semi-conducting layer;
a third semi-conducting layer surrounding the second insulating layer;
a second plurality of electrical conductors located around the third semi-conducting layer, wherein the second plurality of electrical conductors defines a second electrical path that is different from the first electrical path;
a fourth semi-conducting layer surrounding the second plurality of electrical conductors;
a third insulating layer surrounding the fourth semi-conducting layer;
a plurality of strength elements located around the third insulating layer; and
a jacket surrounding the plurality of strength elements.

* * * * *